United States Patent [19]

Branscome et al.

[11] 4,170,714

[45] Oct. 9, 1979

[54] DIGITAL CRYPTOGRAPHIC SYSTEM AND TESTING THEREOF

[75] Inventors: Kenneth M. Branscome; Barrie O. Morgan, both of Dallas; Merlon B. Carter, Richardson, all of Tex.

[73] Assignee: Datotek, Inc., Dallas, Tex.

[21] Appl. No.: 910,010

[22] Filed: May 26, 1978

Related U.S. Application Data

[62] Division of Ser. No. 740,599, Nov. 10, 1976, Pat. No. 4,133,973.

[51] Int. Cl.$^2$ ............................................. H04L 9/00
[52] U.S. Cl. ................................. 178/22; 340/146.1 E
[58] Field of Search ..................... 178/22; 340/146.1 E

[56] References Cited

U.S. PATENT DOCUMENTS

| | | | |
|---|---|---|---|
| 2,898,402 | 8/1959 | Cory et al. | 178/22 |
| 3,633,178 | 1/1972 | Zopf | 340/146.1 E |
| 3,878,331 | 4/1975 | Morgan et al. | 178/22 |
| 3,889,109 | 10/1975 | Blessin | 340/146.1 E |
| 3,911,216 | 10/1975 | Bartek et al. | 178/22 |
| 3,920,975 | 11/1975 | Bass | 340/146.1 E |
| 3,943,348 | 3/1976 | Akriche et al. | 340/146.1 E |
| 4,034,195 | 7/1977 | Bates et al. | 340/146.1 E |
| 4,079,188 | 3/1978 | Kinch, Jr. et al. | 178/22 |

*Primary Examiner*—Howard A. Birmiel
*Attorney, Agent, or Firm*—Richards, Harris & Medlock

[57] ABSTRACT

The specification discloses a digital cryptographic system wherein each of the transmitting and receiving units includes a housing having a front panel. A push-button switch input array is mounted on the front panel, with each push-button switch corresponding to a different number to enable the manual inputting of code variables therethrough. A digital display is provided on the front panel to temporarily display each of the code variables input through the array. Storage circuits are provided to store the code variables input through the array. A switch is provided on the front panel to enable any one of the stored code variables to be selected. A random code generator is operable in response to the selected stored code variables in order to generate a sequence of randomized key digital bits. Circuitry is provided to encipher clear text digital data in a synchronous manner and to transmit enciphered data through a synchronous data link.

2 Claims, 19 Drawing Figures

FIG. 8

DIGITAL CRYPTOGRAPHIC SYSTEM AND TESTING THEREOF

This is a division of application Ser. No. 740,599 filed Nov. 10, 1976, now U.S. Pat. No. 4,133,973.

FIELD OF THE INVENTION

This invention relates to cryptographic methods and systems, and more particularly relates to a digital cryptographic system having synchronous and asynchronous capabilities.

THE PRIOR ART

A large number of techniques have been heretofore developed for encrypting or enciphering data. In particular, very sophisticated systems have been heretofore developed for enciphering synchronous digital data. A need has, however, arisen for a practical system for enciphering synchronous digital data with a high degree of security, and yet with a minimum of operator required intervention.

With prior digital cryptographic systems, it has been heretofore known to input "codes for the day" and other sequential codes in both the transmitting and receiving units in order to provide a higher degree of security for the cryptographic system. Such code input into previously developed cryptographic devices has been accomplished by pin board mechanisms, rotatable thumbwheel switches and the like. Not only have such previously developed techniques been subject to human error, thereby resulting in an erroneous code being entered, but such prior code input devices have been less than totally secure inasmuch as the input code was subject to unauthorized visual detection in certain circumstances. Moreover, such previously developed input code techniques have generally not enabled the input of more than one code at a time and have required periodic code renewal.

A need has thus arisen for a code input technique which tends to eliminate human error during entry and which does not provide a lasting visual indication of the code input into the system. Moreover, a need has arisen for a technique wherein a plurality of different codes may be input at one time into a cryptographic system and then selectively recalled for use when desired. A need has also arisen for a technique for checking the coded input into a system for accuracy and for checking the operation of a coding device to insure that malfunctions have not occurred.

SUMMARY OF THE INVENTION

In accordance with the present invention, a digital cryptographic system includes a housing having a front panel. A code input array is mounted on the front panel and includes a plurality of push-button switches, each corresponding to a different number and selectively operable to input code variables. A display is provided to temporarily display the code variable input through the array. A memory is provided within the housing for storing the code variables input through the array. A random code generator is operable in response to a code variable stored in the memory to generate a sequence of randomized key digital bits. Circuitry is provided to receive clear text digital data and to encipher the clear text digital data in response to the key digital bits.

In accordance with another aspect of the present invention, a digital cryptographic system includes an array on a housing for inputting a plurality of different code variables. A memory is provided in the housing to store the code variables. A switch is provided on the housing to enable selection of any desired one of the stored code variables. A random code generator in the housing is responsive to the selected code variable for generating a stream of randomized key digital bits. Synchronous clear text digital data is applied to the housing, and enciphering circuitry therein enciphers the synchronous clear text digital data and generates an enciphered synchronous digital stream.

In accordance with another aspect of the invention, a digital cryptographic system is provided for enciphering synchronous data signals transmitted from a data terminal through a modem to a receiving station. Circuitry receives a request signal from the data terminal and inputs the request signal to the modem in order to synchronize the modem. Circuitry is responsive to a clear to send signal generated by the modem upon synchronization thereof for generating prime and synchronization signals and for inputting the prime and synchronization signals to the modem for transmission to the receiving station. Circuitry is responsive to the synchronization of the receiving station for generating a clear to send signal and for transmitting the clear to send signal to the terminal to enable clear text digital data to be input to the cryptographic system. Circuitry synchronously enciphers the clear text digital data and transmits the enciphered digital data to the modem for transmission to the receiving station.

DESCRIPTION OF THE DRAWINGS

For a more complete understanding of the present invention and for further objects and advantages thereof, reference is now made to the following detailed description taken in conjunction with the accompanying drawings, in which:

FIGS. 7 and 8 are detailed schematic diagrams of the control logic shown in block diagram in FIG. 6;

DESCRIPTION OF THE PREFERRED EMBODIMENT

SYSTEM FRONT PANEL

Figure 1:
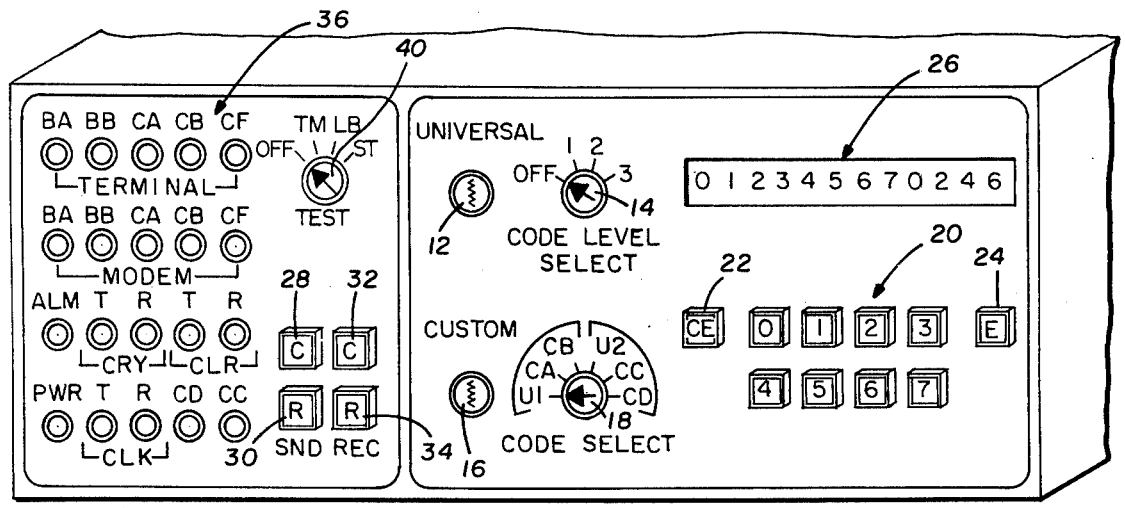
FIG. 1 is an illustration of the front panel of the present cryptographic system.

Referring to FIG. 1, the front panel of the encoding and/or decoding unit of the present invention is illustrated and is identified generally by the numeral 10. It will be understood that one of the units 10 is located at the sending or enciphering station, while an identical unit 10 is located at the receiving or deciphering station. Unit 10 may be interconnected between a digital data terminal such as a teleprinter or the like and a modem which is connected to a transmission line, a computer or the like. The present unit operates to provide synchronous enciphering and deciphering in the manner to be subsequently described.

Referring to the front panel of the unit 10, a key aperture 12 is adapted to receive a specialized universal key to enable a universal code to be entered into the system. A code level select switch 14 may be rotated to an off position and to three different positions to enable the input of a code at several code levels to provide safeguards in using the unit 10. A custom key aperture 16 is adapted to receive a specialized custom key to enable the input of a custom code. A code select switch 18 may be moved to any one of six different codes, including two universal codes and four custom codes.

A keyboard array is provided to enable codes to be input into the unit 10. The keyboard comprises eight push-button switches identified generally by the numeral 20, the push-button switches correspond to the octal numbers 0-7. Only eight push-button switches are provided inasmuch as the system operates only upon octal codes. A CE push-button switch 22 represents the clear entry button. An E push-button switch 24 represents the entry button to enable entry of data. A twelve digit light emitting diode display identified generally by the numeral 26 is provided in the front panel of the unit 10 to enable the code sequence input by depression of push-button switches 20 to be visually presented to the operator.

A clear push-button switch 28 and a reset push-button switch 30 are provided for the send channel of the unit 10. A clear push-button switch 32 and a reset push-button switch 34 are also provided for the receive channel of the unit 10. The clear switches 28 and 32 may be depressed to force the unit 10 to the bypass mode for testing. The reset push-button switch 30 may be depressed to force off or "kill" the request to send signal from the input terminal. The reset switch 34 may be depressed to force off or "kill" the carrier detect signal from the modem in the receive channel.

A plurality of lights or display lamps identified generally by the numeral 36 are presented on the left side of the front panel of the unit 10. The BA lamp under both the terminal and modem legend are illuminated when standard EIA or transmit data is available. The BB lamps are illuminated when receive data is available. The CA lamps are illuminated when a request to send signal is available at the unit. The CB lamps are illuminated when clear to send signals are available. The CF lamps are illuminated when carrier detect signals are available. These lamps illuminate in response to the modem and terminal interface signals to assist in troubleshooting the system. The ALM lamp is illuminated during an alarm condition. The T(CRY) lamp is illuminated when the send section is in the enciphering mode. The R(CRY) lamp is illuminated when the receive section is in the enciphering mode. The T(CLR) lamp is illuminated when the send section is in the clear mode. The R(CLR) lamp is illuminated when the receive section is in the clear mode.

The PWR lamp is illuminated when the power is on to the system. The T and R lamps over the CLK legend are illuminated when the tranmitter or receiver clock is available at the appropriate interface. The CD lamp is illuminated when the data set is ready, while the CC lamp is illuminated when the data terminal is ready.

An important aspect of the present invention is that a plurality of codes may be very easily and accurately entered into the unit 10, even during enciphering or deciphering of a message. Two universal codes and four custom codes may be selectively input into the system by proper operation of switches 14, 18, 12 and 16 in conjunction with push-button switches 20, 22 and 24.

To enter a universal code into the unit 10, the key to lock aperture 12 is inserted and the lock is turned to the on position. The clear entry push-button 22 is then depressed. The code select switch 18 is positioned at the U1 position and the code level select switch 14 is placed at the one position. Twelve digits representing a code variable are entered through the keyboard by depression of the various push-button switches 20. Each digit input by push-button switches 20 will appear in its sequence of entry on the display 26. If the proper entry is not displayed on display 26, the clear entry push-button 22 is momentarily depressed. This will clear the entry from the display, but will not affect any variable already entered into the unit 10. After depressing the clear entry push-button 22, the correct entry can be made. After all twelve digits have been entered, the enter push-button 24 is then depressed to enter the code variable into the unit 10 and extinguish the display 26.

The code level select switch 14 is then moved to the two position and a second twelve digit code variable is entered through the keyboard by depression of the various push-button switches 20. If a proper number is not displayed on display 26, the clear entry push-button 22 may be depressed to clear the entry from the display, but this will not affect any number already entered into the unit 10, including the first twelve digits of the universal code already entered. When all twelve digits of the second code variable are entered, the enter push-button 24 is depressed to enter this code variable into the unit 10.

To enter a second universal code, the code level select switch 14 is again placed at the one position and the code select switch 18 is then moved from the U1 position to the U2 position. A second different universal code may then be entered in the same manner as previously described. After entering all the universal codes, the code level select switch 14 is positioned to the off position and the universal key is removed from lock aperture 12.

To enter a custom code into the unit 10 the key to lock aperture 16 is inserted and the lock is turned to the on position. The code level select switch 14 is placed at the one position and the code select switch 18 is placed at the CA position. The desired 12 digit code variable is then entered through the keyboard and the enter push-button 24 is depressed to enter the code variable. The code level select switch 14 is then moved to the two position and a second level of a code variable is entered through the keyboard by depression of the various push-button switches 20. After the second twelve digits have been entered, the enter push-button 24 is depressed to enter the second code level into the memory unit 10 and to extinguish the display on display 26. The code level select switch 14 is then moved to position 3 and a third 12 digit code variable is entered through the keyboard. When all twelve digits have been entered, the enter push-button 24 is depressed to enter the third code level into the unit 10 and extinguish the display 26.

To enter the remaining three custom codes, the code select switch 18 is positioned opposite the CB, CC and CD position. Three levels of code variables are entered at each custom code position by rotating the code level select switch 14 to the 1, 2 and 3 positions. At each of the three levels a different 12 digit code variable is entered through the keyboard by depression of the various push-button switches 20. After entering all custom codes, the code level select switch 14 is positioned to the off position and the custom key is removed from the lock aperture 16.

It can therefore be seen that a universal code requires two levels of code variable entries while a custom code requires three levels of custom code variable entries. It is not necessary to reenter all codes each time it is desired to change a code. If desirable, only one level of one code may be changed without affecting any other settings. When the unit 10 is fully loaded, six different codes have been input into the unit 16 and stored for future use. Any one of the six codes may be selected by operation of the code select switch 18.

An important aspect of the invention is that when the code select switch 18 is placed at the U1 or U2 positions, only the universal codes are utilized for encoding in the system. However, when the code select switch is placed in the CA position, both the universal code U1 and the custom code CA are utilized for encoding of the device. Similarly, when the code select switch 18 is placed in the CB, CC or CD positions, both a universal and custom code are utilized for enciphering. The enciphering with the combined universal and custom codes thus provides a more secure encoding operation of the machine.

Several safeguards for the operation of the system are built into the unit 10 to prevent false entries into the memory units. An entry cannot be made unless exactly 12 digits are entered for each code level. If more than twelve digits are entered on the display, an alarm is indicated and the entry cannot be made. Similarly, if fewer than twelve digits are entered on the display, the entry cannot be made. If an attempt is made to enter a third code level in a universal code mode, an alarm is indicated. If the custom code lock aperture 16 is on and an attempt is made to enter a universal code, the entry cannot be made. And similarly, if the universal lock aperture 12 is on and an attempt is made to enter a custom code, the entry cannot be made.

The system front panel also includes a test switch 40 which is utilized to test the unit 10, the modem on both ends of the data link and the data link itself. The off position of switch 40 is the normal position during operation of the unit 10. In the TM or test mode of operation, the unit 10 is disconnected from the data terminal and a test signal is connected to the send data input (BA). This test pattern consists of approximately 1.5 seconds of steady mark, followed by approximately 1.5 seconds of steady space. The positioning of switch 40 opposite the LB (loop back) position disconnects the unit 10 from the data terminal and the receive decoded data output (terminal BB) is connected directly to the send data input (terminal BA). In the ST or self-test mode of operation, the unit 10 is disconnected from the terminal and the modem. The send data output (modem BA) is connected to the receive data input (modem BB). The test pattern previously described for use in the TM mode of operation is connected to the send data input (terminal BA). The testing procedure will be subsequently described with reference to FIG. 15.

As previously noted, the unit 10 is normally interconnected between a conventional data terminal such as a teleprinter or the like and a modem which is connected to a transmission line. In operation of the unit 10 in the enciphering mode, the unit is turned on by a power switch located on the back of the unit, not shown. The operator types in a request to send signal from the data terminal. The unit 10 passes the request to send signal to the modem and the modem becomes synchronized. When synchronized, the modem sends a clear to send signal to the unit 10. The unit 10 then sends prime and synchronizing signals through the modem and a transmission line to the remote deciphering unit. When the transmitting and receiving systems of the invention are synchronized, a clear to send signal is applied from the unit 10 to the data terminal.

Upon receipt of the clear to send signal at the data terminal, the operator operates the data terminal to synchronously transmit data through the unit 10 and through the modem to the transmission line to the receiving station. The data entered on the terminal is enciphered or scrambled by the unit 10 and thus the information synchronously sent on the transmission channel is enciphered with a high degree of complexity and resulting security. The manner in which the data entered on the data terminal is enciphered may be selectively changed by changing the code select switch 18 on both the transmit and receiving enciphering systems.

SYSTEM BLOCK DIAGRAM

Figure 2:
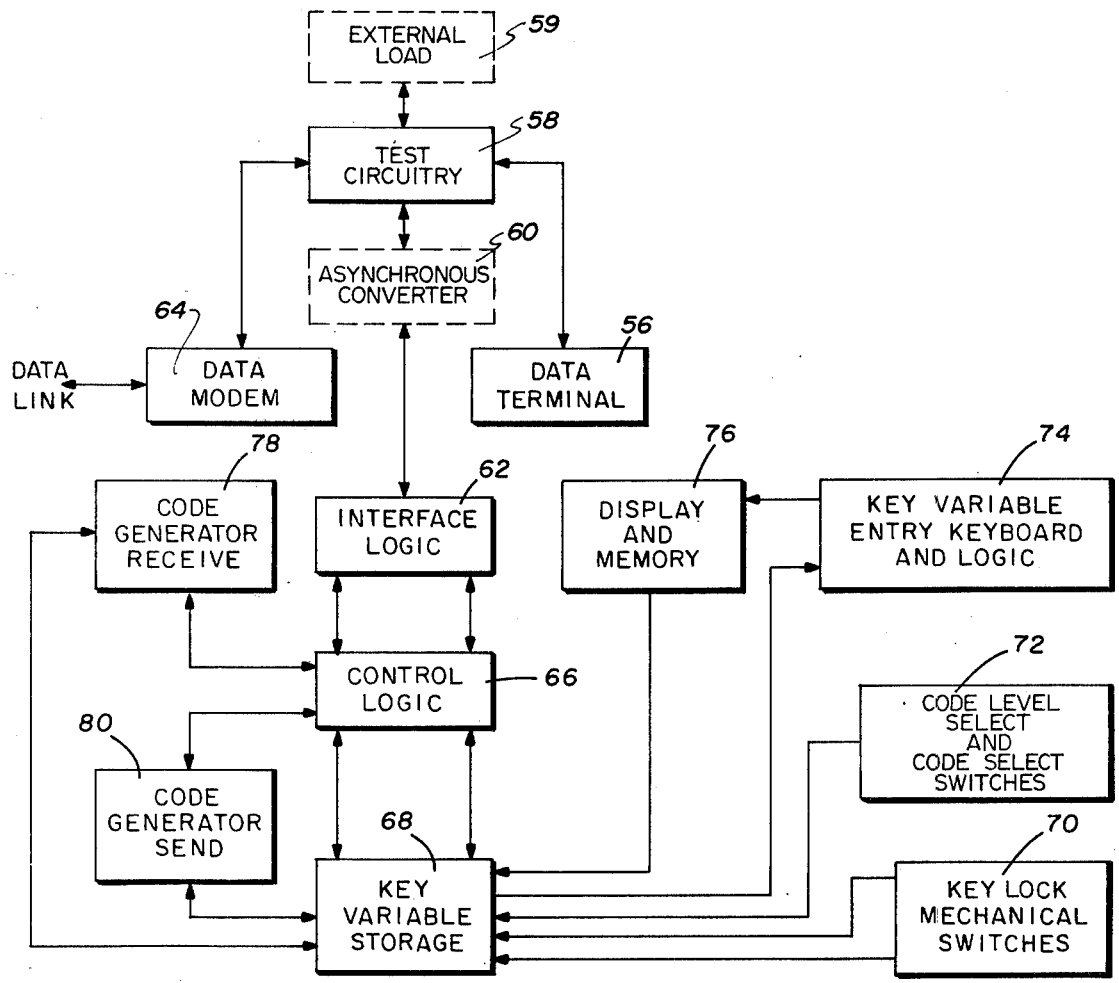
FIG. 2 is a block diagram of the cryptographic system of the invention.

FIG. 2 is a block diagram of the present enciphering system. A data terminal 56 may comprise, for example, a conventional synchronous data terminal or the like for generating digital signals through the operation of a keyboard. The data terminal 56 is interconnected to the test circuitry 58, which performs the signal routing functions necessary to perform the system tests in connection with test switch 40 (FIG. 1), previously described. The test circuitry may be interconnected to an optional external load 59. The test circuitry 58 may also be connected to an asynchronous converter 60, which converts asynchronous data to synchronous data in the receive mode of operation of unit 10 and synchronous data to asynchronous data in the send mode of operation of unit 10. The asynchronous converter 60 provides unit 10 with the additional capability of receiving asynchronous data.

If the asynchronous converter 60 is not utilized, the test circuitry 58 is directly connected to the interface logic 62 of the present enciphering system. Interface logic 62 is also connected to a data modem 64 through the test circuitry 58. The data modem 64 may comprise any suitable conventional synchronous data modem. The output of the data modem 64 is applied to a data link such as a teleprinter transmission line or the like. The interface logic 62 of the present system is applied to control logic 66, which acts to control the various functions of the system. The key variable storage 68 contains memories for storing the codes input to the unit 10 via the push-button switches 20 in the manner previously described.

The key lock mechanical switches 70 comprise the mechanical switches associated with the lock apertures 12 and 16 previously described and shown in FIG. 1. The code level select and code select switches 72 comprise the switches 14 and 18 (FIG. 1) and their associated circuitry. The key variable entry keyboard and logic 74 comprise the keyboard array and push-button switches 20, 22 and 24 (FIG. 1), and logic and debounce circuitry to control the key variable entry. Logic 74 also includes two shift registers. One shift register indicates to the keyboard which digit is being entered next in the display, and the second shift register shifts the entered data out to the key variable storage 68.

The display and memory 76 comprises the display 26 (FIG. 1), along with associated electronic circuitry. A code generator receive circuit 78 and a code generator send circuit 80 operate to control the operation of the code generator of the system in transmit and receive modes. The code generator will not be described in detail, but may comprise the random digital code generator described in U.S. Pat. No. 3,781,473, issued Dec. 25, 1973. The code generator is used for the known function of generating a long term stream of nonlinear psuedo-random digital bits in order to encode clear text digital data.

In operation of the present system, digital signals are applied from the data terminal 56 through the test circuitry 58 to either the asynchronous converter 60 or directly to the interface logic 62. The interface logic 62 converts the data terminal signals to standard logic levels and operates on these logic levels to produce control signals for application to the control logic 66. The control logic 66 operates to encipher the data in accordance with the key variables stored in key variable storage 68 and code generator send 80. The control logic 66 then transmits the enciphered data through the interface logic 62 to the data modem 64 through the asynchronous converter 60, if asynchronous data is desired, and the test circuitry 58. The interface logic 62 converts logic signals to standard digital signals according to EIA specification for interfacing to digital equipment. The present circuitry also includes synchronization and correlation circuitry which will be subsequently described in greater detail. The system operates to decipher data obtained from the data modem 64 in the reverse manner.

LOGIC SIGNAL DESIGNATIONS

To assist in explanation of the present system, the following is a tabulation of some of the more important mnemonics used to denote some of the logic signals in the system. The signals beginning with the prefix "M" designate that the signal is either generated or applied to the data modem. The signals beginning with the prefix "T" designate that the signal is either generated or applied to the data terminal. Signals having a suffix "-" designate the inverted form of the signal, while the suffix "*" designates that the signal has been modified in some respect but retains its basic characteristics.

| | |
|---|---|
| MBA | Send Data Output to the modem |
| MBB | Receive Data from the modem |
| MCG | Signal Quality input from the modem |
| MRTS | Request to send to the modem |
| MCTS | Clear to send from the modem |
| MDSR | Data set ready from the modem |
| MCF | Carrier detect from the modem |
| MDB | Send clock from the modem |
| MDD | Receive clock from the modem |
| MDTR | Data terminal ready to modem |
| MDA | Send clock to the modem |
| MTCK (TCLK) | Modem test clock used during test mode only |
| TBA | Send data from data terminal |
| TBB | Received data to data terminal |
| TRTS | Request to send from data terminal |
| TCTS | Clear to send to data terminal |
| TDSR | Data set ready to data terminal |
| TCF | Carrier detect to data terminal |
| TDB | Send clock to data terminal |
| TDD | Receive clock to data terminal |
| TDTR | Data terminal ready from data terminal |
| TDA | Send clock from data terminal |
| TSTBA | Data Source used during test mode only |
| XV | Unscrambled send data from data terminal |
| TCVID | Transmit coded video send data |
| PRB | Signal which corresponds with TCTS |
| TCRYPT | Transmit crypto |
| THOLD | This signal goes high during each transmit data clock interval |
| QVID | Received scrambled data from the modem after data has beem buffered and synchronized with the internal master clock |
| DVID | Received data after it has been decoded |
| REC | Initialization for the receive synchronization |
| RECRYPT | Receive crypto signal |
| RHOLD | Signal goes high during each receive data clock interval |
| FC1 | Fast clock phase one |
| FC3 | Fast clock phase two |
| AL1C | Alarm signal from code generator checker |
| AL3- | Alarm signal from key variable entry circuits |
| CGC | Code generator clock |
| HORN | Signal line to the alarm horn |
| HDCONT | Half duplex control |
| TLOAD* | Signal to the key variable storage circuit to load the selected key variable into the send code generator |
| RLOAD* | Signal to the key variable storage circuit to load the selected key variable into the receive code generator |
| RKEY | Key bits used to decipher the received data |
| TKEY | Key bits used to encipher the send data |
| TRK | Transmit request for key |
| TC | Test ciock signal |
| CLRR | Clear signal |
| CLRF | Clear function signal |
| DELAY- | Delay signal from terminal |
| RSNK- | Resynchronization signal |
| TEST | Test signal, TM test mode |
| TPDO | Transmit prime data out from the send key generator |
| TRDI | Transmit prime data to the send key generator |
| TCT | Delayed cipher text for the send code generator |
| TRAND | Stand-by mode signal to the code generator to place it in the randomize mode |
| TPRIM | Transmit send prime signal |
| RRK | Receive request for key |
| RPDI | Received prime data to the receive code generator |
| RCT | Delayed received cipher text for the code generator |
| RRAND | Stand-by signal to the receive code generator |
| RPIM | Receive prime signal |
| AL1 | Code generator failure alarm signal |
| ALC | Code generator checker failure alarm signal |
| LR1(T), LR2(T), | Code generator key variable distribution lines to the send code generator |

-continued

| | |
|---|---|
| K1(T), K2(T), K3(T) KEY(T) | Key bit stream from transmit send code generator |
| LOAD(T) | Transmit load control to the send code generator |
| KGCP(T) | Gated clock to the send code generator |
| MCLR | Master clear |
| CRYPT(T) | Signal places the send code generator in the crypto mode |
| CRYPT(R) | Signal places the receive code generator in the crypto mode |
| LR1(R), LR2(R), K1(R), K2(R), K3(R) | Key variable distribution lines to the receive code generator |
| LDRSNK | Reset for resync delay |
| TNS | New sync input from data terminal |
| CT15 | Count 15 |
| SRCPB | Receive clear control line |
| STCPB | Send clear control line |
| SRRST | Receive reset |
| STRST | Send reset |
| ITBA | Terminal send data indicator |
| ITBB | Terminal receive data indicator |
| ITCA | Terminal request to send indicator |
| ITCB | Terminal clear to send indicator |
| ITCF | Terminal carrier detect indicator |
| IMBA | Modem receive data indicator |
| IMBB | Modem receive data indicator |
| IMCA | Modem request to send indicator |
| IMCB | Modem clear to send indicator |
| IMCF | Modem carrier detect indicator |
| IALM | Alarm indicator |
| ITCPT | Send crypto indicator |
| IRCPT | Receive crypto indicator |
| ITCLR | Send clear indicator |
| IRCLR | Receive clear indicator |
| ITCLK | Send clock indicator |
| IRCLK | Receive clock indicator |
| ICD | Data terminal ready indicator |
| ICC | Data set ready indicator |
| KEY(R) | Receive code generator key bit stream |
| LOAD(R) | Receive load control to the receive code generator |
| KGCPR | Gated clock pulses to the receive code generator |
| BINT(T) | Battery interlock |
| BINT(R) | Battery interlock |
| UNIV | Signal to the code generator to place code generator in the universal enciphering mode |
| E1, E2, E3 | Address control lines for the key variable memory |
| ENT | Enter |
| VSCP | Clock used to transfer the key variable from the external load |
| ESRO* | External shift register output |
| OFF | Control signal from the code level switch |
| AL1* | Alarm signal indicator |
| SRO* | Key variable data shift register output |
| UKEY | Universal mechanical lock switch signal to allow entry of universal key variable |
| CKEY | Custom mechanical lock switch signal to allow entry of custom key variable |
| L1, L2, L3 | Code level select lines |
| U1, U2 | Universal code select lines |
| CB, CC, CD | Custom code select lines |
| KS- | Key select |
| AL3 | Signal from the receive correlator indicating the receipt of a perfect inverted correlation pattern |
| MD | Majority decision, signal from the receive correlator |
| TM | Test signal, test mode |
| ST | Test signal, self-test mode |
| LB | Test signal, loop back mode |
| TCH | Out of sync, initiate from the terminal |
| MCI | Data signal rate selector to the modem |

INTERFACE LOGIC

Figure 3:
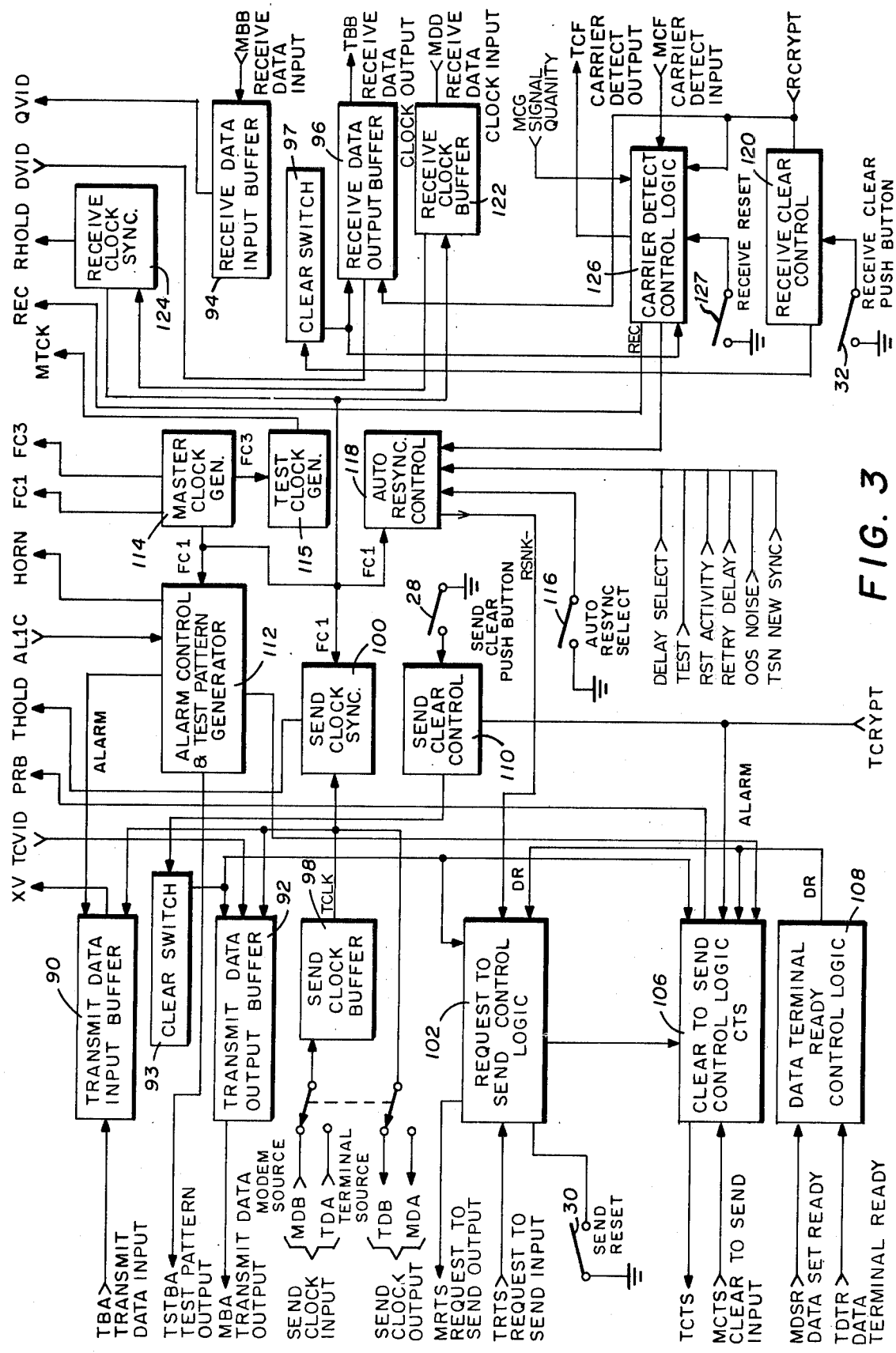
FIG. 3 is a detailed block diagram of the interface logic shown in FIG. 2.

Referring to FIG. 3, a block diagram of the interface logic 62 (FIG. 2) is illustrated. The transmit data input (TBA) is applied to the transmit input buffer 90. The transmit data output (MBA) is output from a transmit data output buffer 92. The receive data input (MBB) is applied to a receive data input buffer 94. The receive data output (TBB) is generated from the receive data output buffer 96.

The clear switch 93 is operable by response to the position of the clear push-button switch 28, previously shown in FIG. 1, and is connected to buffers 92, 102 and 106 in order to enable operation in the clear mode. Similarly, the clear switch 97 operable in response to the operation of the receive push-button 32 (FIG. 1) is connected to buffers 96 and 126.

A send clock buffer 98 receives the send clock input from either the data modem or the terminal and applies the input to a send clock synchronizer 100. The send clock buffer 98 thus receives the clock from the modem which is asynchronous to the internal circuitry and synchronizes the modem clock with the internal clock of the system. The request to send control logic 102 converts data to the EIA signal levels for transmission in digital form, and also checks to see if the clear switch 28 has been depressed. The send reset switch 30 is connected to the control logic 102. The data terminal ready control logic 108 receives the data set or data terminal ready signal and applies the DR signal to the request to send control logic 102 in order to enable the request to send output signal MRTS to be applied to the data modem.

When the data modem receives the request to send output, the modem establishes synchronism and then sends back the clear to send input signal MCTS to the control logic 106. Control logic 106 then immediately applies the signal PRB to the control circuitry to be subsequently described.

The send clear push-button 28 is connected to the send clear control 110 which operates the clear switch 93. When the signal TCRYPT is received by the send clear control 110, the clear control 110 cannot operate the clear switch 93 due to depression of the send clear push-button switch 61 and prevents the unit from being placed in the clear mode. The send clear control 110 enables the system to go to the clear only between the time that request to send goes high, but before the unit goes to the crypto mode of operation. If the system is not placed in the clear during this period of time, then the clear control 110 is inhibited from going to the clear. The TCRYPT signal is also applied to the clear to send control logic 106 and, assuming that the ready control logic 108 is set correctly and the alarm circuit is not on, the clear to send control logic 106 transmits the clear to send signal TCTS to the terminal in order to complete initialization for the system for transmission.

An alarm control and test pattern generator 112 generates a test pattern, an alarm and horn signal in a manner to be subsequently described. The master clock generator 114 provides timing clock signals FC1 and FC3 to the remainder of the circuit. The FC3 clock signal generated by the master clock generator 114 is applied to the test clock generator 115, which generates the MTCK clock signal. An automatic resynchronization select switch 116 is disposed internal to the unit 10 and controls an automatic resync control 118 in order to place the system in the automatic resync mode.

The auto resynchronization control 118 operates such that if carrier detect is momentarily lost from the modem, the unit 10 is caused to go to an automatic resync cycle. Thus, the request to send is inhibited via the request to send control logic 102, thereby causing the transmit section of the modem to drop its carrier. After a predetermined period of time, the request to send is allowed to come back on, thereby causing the reinitialization of the synchronization cycle and the reinitialization of the system.

In addition to reinitialization of the system upon loss of carrier detect, the automatic resychronization control 118 will reinitialize the system upon request to send being turned on from the terminal, momentary or prolonged loss of data terminal ready (CD), momentary or prolonged loss of data set ready (CC), momentary or prolonged loss of signal quality (CG), momentary or prolonged loss of CH from the terminal or CI from the modem, clear to send control line activity out of synchronization, excess transitions beyond the out-of-sync noise tolerance and a long mark signal on the receive data line. These options will be subsequently described in connection with the operation of the auto resynchronization control 118 and FIG. 5a.

On the receive side of the interface circuitry, the RCRYPT signal is generated after initialization of the code generator of the system. The signal RCRYPT is applied to the receive clear control 120, thereby turning the receive clear key control off so that the unit cannot be placed into the clear by depression of the receive clear push-button switch 32 (FIG. 1). The receive clear control 120 controls the operation of the clear switch 97.

The receive clock buffer 122 synchronizes the receive clock from the modem to the internal high speed master clock of the present invention. The receive clock synchronizer 124 metes out the data clocks to the receive controller, to be subsequently described, during the operation of the correlator of the system. The carrier detect control logic 126 generates a signal REC to the receive controller, in response to input MCF assuming that the unit is not placed in the clear and that the RCRYPT signal has not yet been received. If the signal RCRYPT is received and the unit is not in the alarm state, the signal TCF is applied as the carrier detect signal to the terminal.

Figure 4A:
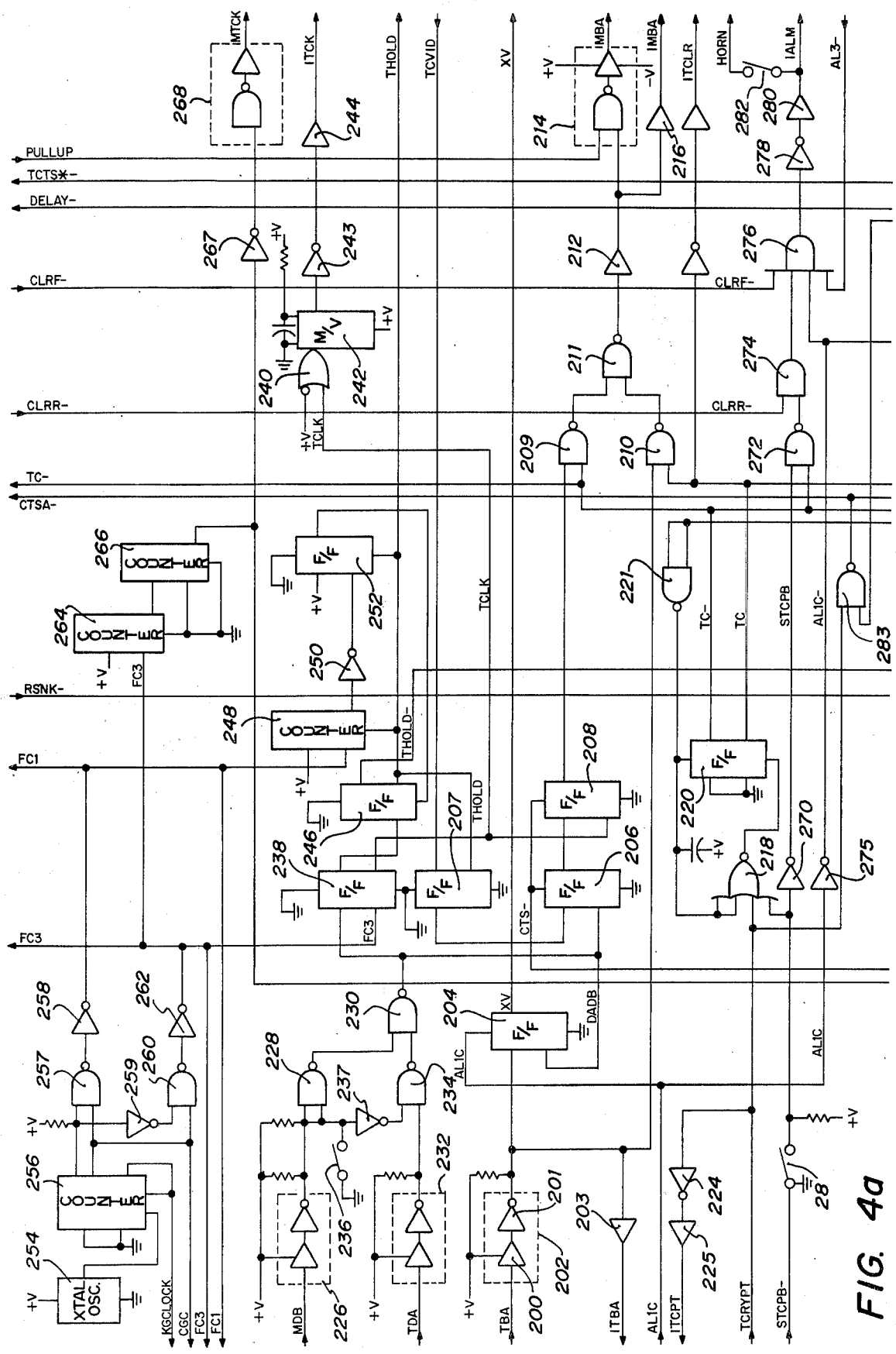
FIGS. 4a-4b are detailed schematic diagrams of a portion of the interface logic circuit shown in block diagram in FIG. 3.
Figure 4B:
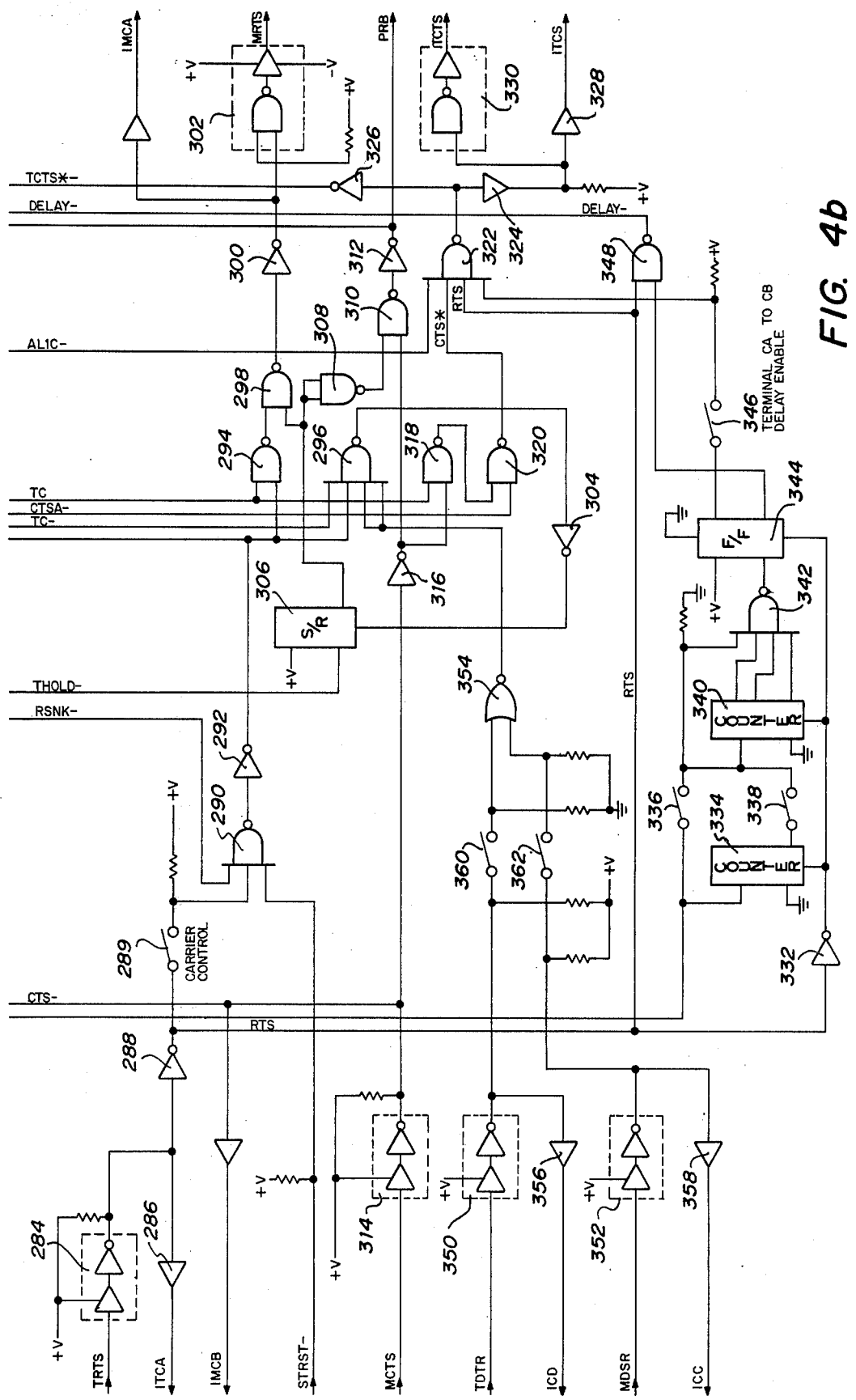

FIGS. 4a and 4b illustrate a portion of the schematic circuitry which corresponds to the block diagram of the interface logic shown in FIG. 3. FIGS. 4a and 4b are drawn to be matched in a side-by-side relationship to illustrate this portion of the electrical schematic of the interface circuitry. Referring to FIG. 4a, operational amplifier 200 is interconnected to a converter 201 to form a conversion circuit 202 for receiving the TBA signal. The conversion circuit 202 is a special integrated circuit that converts EIA signals to standard logic signals and may comprise, for example, a 75154 I/C. Conversion circuit 202 holds the data signals for one data bit and is interconnected to flip-flop 204. Flip-flop 204, together with the conversion circuit 202, comprise the transmit data input buffer 90 (FIG. 3). Flip-flop 204 generates the XV signal, and integrated circuit 202 through inverter 203 generates the ITBA signal.

Flip-flop 204 is interconnected to a flip-flop 206, which is interconnected to a flip-flop 207. Flip-flop 206 is interconnected to a flip-flop 208. Flip-flops 206, 207 and 208 are standard dual "D" flip-flops and may comprise, for example, 4013 I/Cs. Flip-flop 208 is interconnected to NAND gate 209, which with NAND gate 210 is interconnected to NAND gate 211. NAND gate 211 is connected through a converter 212 to a dual line driver 214. Driver 214 may comprise, for example, a 75150 circuit to generate the MBA output signal. Converter 212 is also interconnected to inverter 216 to generate the IMBA output signal. Flip-flops 206, 207 and 208 together with NAND gates 209, 210 and 211 and driver 214 comprise the transmit data input buffer 90 (FIG. 3).

The TCRYPT signal is applied to NOR gate 218, which is a dual 4-input NOR gate and may comprise, for example, a 4002 I/C. NOR gate 218 is interconnected to a flip-flop 220, which is interconnected to NAND gate 221. Flip-flop 220 generates the TC- and TC signals. NOR gate 218, flip-flop 220 and NAND gate 221 comprise the clear switch 93 (FIG. 3). The TCRYPT signal is also applied to inverter 224, which through driver 225 generates the ITCPT output signal.

The MDB signal is applied to receiver 226, which may comprise, for example, a 75154 I/C. Receiver 226 is interconnected to NAND gate 228, which is interconnected to NAND gate 230. The TDA signal is applied to receiver 232, which may comprise, for example, a 75154 I/C. Receiver 232 is interconnected to NAND gate 234, which is interconnected to NAND gate 230. Switch 236 provides an input to NAND gate 228 and an input through inverter 237 to NAND gate 234. Switch 236 provides a clock source from the modem when in the open position and from the terminal when in the closed position. The output of NAND gate 230 is applied to a flip-flop 238, which generates the TCLK signal applied to the transmit data output buffer 92 and the send clock sync period 100 (FIG. 3). Receivers 226 and 232 together with NAND gates 228, 230 and 234 and flip-flop 238 comprise the send clock buffer circuit 98 (FIG. 3). The send clock buffer 98 takes the clock from the data modem 64 which is asynchronous to the internal working of the system and synchronizes that clock with the internal clock of the system so that the data clock corresponds or is in synchronism with the internal clock, and then transmits it back to the data modem 64.

Flip-flop 238 is interconnected to OR gate 240, which provides an input to a multivibrator 242. Multivibrator 242 is a dual retrigger/reset multivibrator and may comprise, for example, a 4528 I/C. The output of multivibrator 242 is applied to an inverter 243, which is interconnected to a driver 244 which generates the ITCK signal. OR gate 240, multivibrator 242 together with inverter 243 and driver 244 comprise the clock indicating driving circuit for the send clock indicator on the front panel of unit 10 and is a portion of the circuitry represented by block 100, the send clock sync. (FIG. 3)

The output of flip-flop 238 is also interconnected to flip-flop 246, which is interconnected to a counter 248. Counter 248 is a dual binary up counter and may comprise, for example, a 4520 I/C. Counter 248 is interconnected through an inverter 250 to a flip-flop 252. The flip-flops 246 and 252, together with counter 248 and their associated circuitry, comprise a portion of the send clock synchronizer identified in FIG. 3 by block 100 which generates the THOLD signal.

A crystal oscillator 254 is interconnected to a counter 256. Counter 256 is a four bit binary counter and may comprise, for example, a 7493 I/C. An output of counter 256 is interconnected through NAND gate 257, which is interconnected to an inverter 258 to generate the FC1 signal. The output of counter 256 which is applied to NAND gate 257 is also applied through an inverter 259 to NAND gate 260. NAND gate 260 is interconnected to an inverter 262 to generate the FC3 output signal. Additional outputs of counter 256 generate the KGCLOCK and CGC signals. In the preferred embodiment, crystal oscillator 254 operates at 5.5296 Hz to produce the KGCLOCK signal having a frequency of 2,764,800 MHz, the CGC signal having a frequency of 691,200 Hz and the signals FC1 and FC3 having a frequency of 345,600 Hz. Crystal oscillator 254, counter 256 together with NAND gates 257 and 260 and their associated inverters comprise the electronic circuitry for the master clock generator identified by block 114 in FIG. 3.

The FC3 signal generated at the output of inverter 262 is applied to a counter 264 which is interconnected to a counter 266. Counters 264 and 266 are dual binary up counters and may comprise, for example, a 4520 I/C. Counter 266 is interconnected through inverter 267 to a driver 268. Driver 268 may comprise, for example, a 75150 I/C and generates the MTCK test clock signal. The MTCK clock source is used during test modes only. Counters 264 and 266 together with converter 267 and driver 268 comprise the circuitry for the test clock generator identified as block 115 in FIG. 3.

The send clear control signal, STCPB- is applied to inverter 270 upon depressing the send clear push-button switch 28. Inverter 270 is interconnected to a NAND gate 272, which is interconnected to AND gate 274. The AL1C signal is applied through inverter 275 to provide an input to NAND gate 276. AND gate 274 also provides an input to AND gate 276, which is interconnected to inverter 278. The output of inverter 278 is interconnected to a driver 280, which generates the IALM alarm indicator signal. The output of driver 280 also generates the HORN output signal applied to the alarm horn if internal switch 282 is in the closed position. Switch 282 functions as a horn inhibit switch. The TCRYPT signal is applied to NAND gate 283 to generate the CTSA- signal. Inverters 270 and 275 together with NAND gates 272, 276 and 283, AND gate 274, inverter 278 and driver 280 comprise the send clear control circuitry represented by block 110 and the alarm control and test pattern generator circuitry represented by block 112 of FIG. 3.

Referring to FIG. 4b, the circuitry representing blocks 102, 106 and 108 of FIG. 3 is shown. The TRTS signal is applied to a receiver 284, and may comprise, for example, a 75154 I/C. The output of receiver 284 is applied to a driver 286 to generate the ITCA signal. The output of receiver 284 is also applied through an inverter 288 and an internal carrier control switch 289 to a NAND gate 290. NAND gate 290 is interconnected through inverter 292 to NAND gates 294 and 296.

NAND gate 294 is interconnected to NAND gate 298, which is interconnected through inverter 300 to an integrated circuit 302. Integrated circuit 302 is a driver circuit and may comprise, for example, a 75150 I/C, which generates the MRTS signal. The output of NAND gate 296 is interconnected through an inverter 304 to a shift register 306. Shift register 306 is a dual four-bit static shift register and may comprise, for example, a 4015 I/C. The output of shift register 306 is applied to NAND gate 308, which is interconnected to NAND gate 310. The output of NAND gate 310 is applied to an inverter 312 to generate the PRB signal. Integrated circuit 284, shift register 306, driver 302 and NAND gates 290, 294, 296, 298, 308 and 310 comprise the circuitry for the request to send control logic identified as block 102 in FIG. 3.

The request to send control logic 102 essentially controls the request to send to the modem. It receives the request to send signal from the terminal, provided that the carrier control switch 289 is not in the open position and the data terminal and data set ready are both on. The RTS signal is then passed by the logic 102 to the MRTS output to the modem. If the unit 10 is in the TC, transmit clear mode, the TRTS signal is applied directly to the MRTS output.

The MCTS signal is applied to a receiver 314 and may comprise, for example, a 75154 I/C. The output of integrated circuit 314 is applied through an inverter 316 to NAND gate 318. NAND gate 318 is interconnected to NAND gate 320, which is interconnected to NAND gate 322. The output of NAND gate 322 is applied through an inverter 326 to generate the TCTS*- signal. The output of NAND gate 322 is also applied through converter 324 to a driver 328 to generate the ITCS signal. The output of converter 324 is also applied to a driver 330 to generate the TCTS output signal.

The RTS signal generated at the output of inverter 288 of the request to send control logic 102 (FIG. 3) is applied through an inverter 332 to counter 334. The output of counter 266 of the test clock generator 115 is also applied to counter 334. Counter 334 is interconnected through delay switches 336 and 338 to counter 340. Counter 340 is interconnected to NAND gate 342, which is interconnected to a flip-flop 344. Flip-flop 344 is interconnected to an internal switch 346, which is the terminal CA to CB delay enable switch. The output of flip-flop 344 is interconnected to NAND gate 348, which generates the DELAY- signal.

The data terminal ready control logic, identified as block 108 in FIG. 3, is composed of the receivers 350 and 352 and NOR gate 354. The TDTR signal is applied to receiver 350, which through driver 356 generates the ICD signal. The MDSR signal is applied to receiver 352, which through driver 358 generates the ICC output signal. The outputs of receivers 350 and 352 are also interconnected to internal switches 360 and 362, which are override switches interconnecting integrated circuits 350 and 352 with NOR gate 354. The output of NOR gate 354 is applied to NAND gate 296 of the request to send control logic 102 (FIG. 3).

Figure 5A:
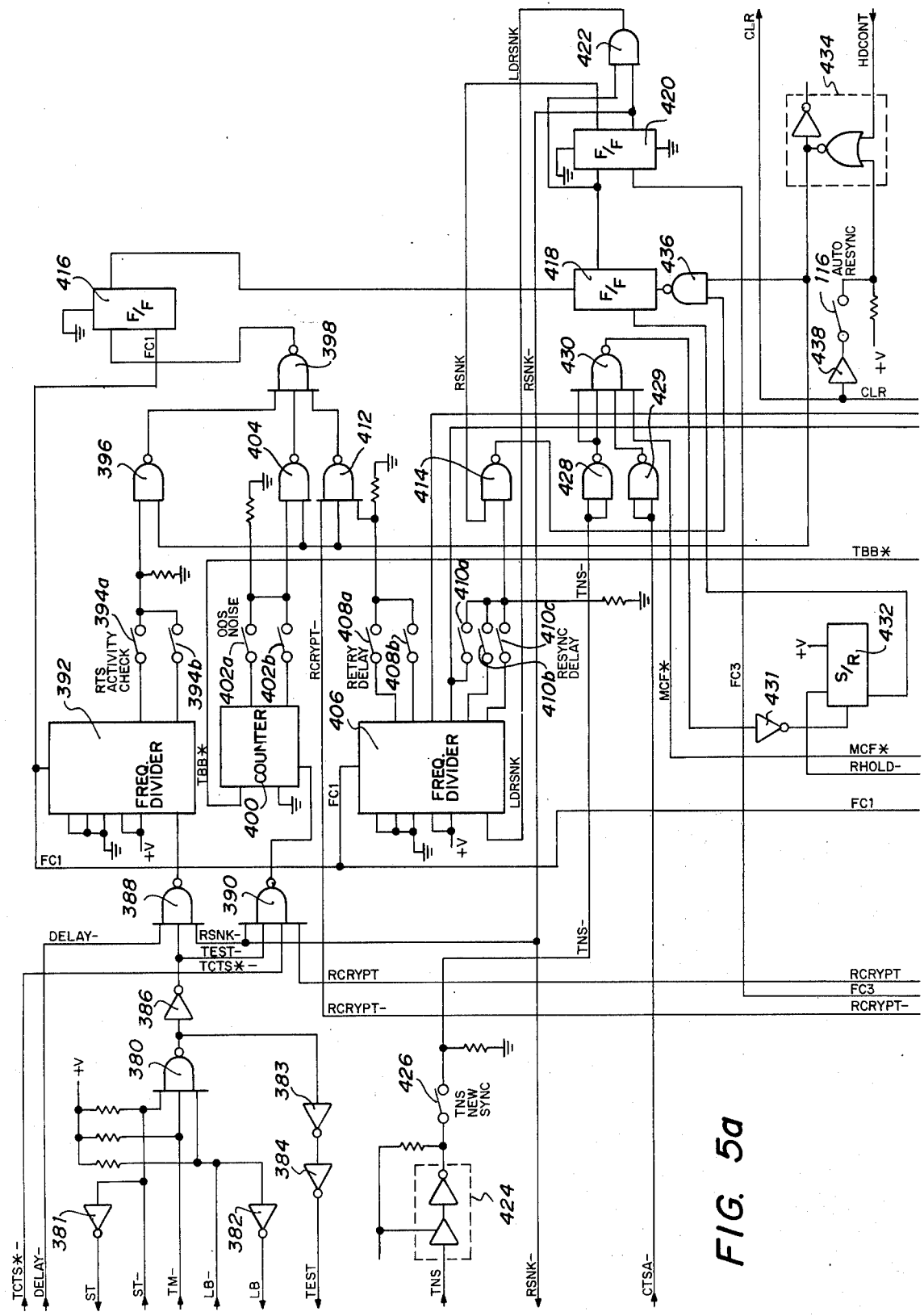
FIGS. 5a-5b are detailed schematic drawings of a portion of the interface logic circuit shown in block diagram in FIG. 3.
Figure 5B:
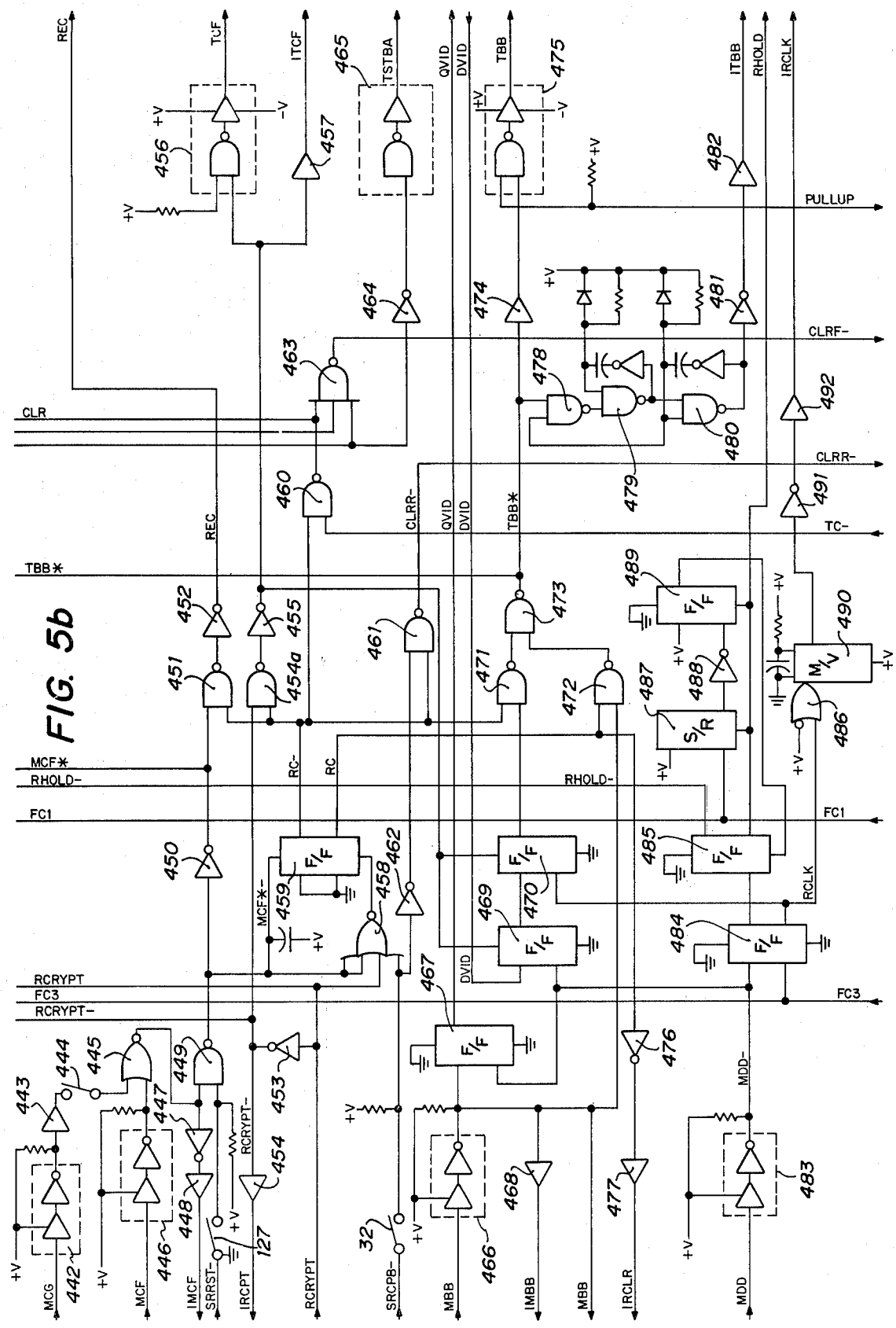

FIGS. 5a and 5b illustrate the remaining portion of the schematic circuitry which corresponds to the interface logic shown in FIG. 3. FIGS. 5a and 5b are drawn to be matched in a side-by-side relationship to illustrate this portion of the electrical schematic of the interface circuitry. Referring to FIG. 5a, the circuitry which corresponds to the automatic resynchronization control, block 118 of FIG. 3, is shown. A resynchronization cycle can be initiated automatically using one of the several selectable options in control 118 or a resynchronization cycle can be initiated either from the data modem 64 or the data terminal 56. If either the receive or the send section of the unit 10 is placed in the clear mode, the automatic resynchronization is inhibited. The automatic resynchronization is enabled by switch 116 (FIGS. 3 and 5a). Automatic resynchronization control 118 generates the RSNK- signal which is applied to the request to send control logic, block 102 of FIG. 3.

Referring to FIG. 5a, the ST-, TM- and LB- signals are applied to NAND gate 380. These three input signals are generated by operation of test switch 40 (FIG.

1). Inverter 381 generates the ST signal, and inverter 382 generates the LB signal. The output of NAND gate 380 is applied through inverters 383 and 384 to generate the TEST output signal. The output of NAND gate 380 is applied through inverter 386 to NAND gates 388 and 390. The DELAY- signal is also applied to NAND gate 388, which is interconnected to frequency divider 392. Frequency divider 392 is a 24-state frequency divider and may comprise, for example, a 4521 I/C. Divider 392 is interconnected to switches 394a and 394b, which can be preset for either a six or twenty-two second period during which time the clear to send signal will be sampled. The clear to send control line to the terminal is constantly being turned on and off. Should the unit 10 lose synchronization, this activity will stop. If no activity is detected during the time period programmed by switches 394a and 394b, an automatic resynchronization cycle is initiated. This option of the automatic resynchronization control, 118, is the RTS Activity Check and can be inhibited by leaving switches 394a and 394b in the open position. The output of divider 392 through switches 394a and 394b is applied to NAND gate 396, whose output is applied to NAND gate 398.

A second option of the automatic resynchronization control, block 118 of FIG. 3, includes the out-of-sync noise tolerance option (OOS NOISE). The circuitry comprising this option includes NAND gate 390, which receives input signals RCRYPT, TCTS*-, TEST- and RSNK-. The output of NAND gate 390 is applied to counter 400. Counter 400 is a dual binary up counter and may comprise, for example, a 4520 I/C. The output of counter 400 is applied through switches 402a and 402b to NAND gate 404. The out-of-sync noise tolerance option monitors the mark to space transistions on the receive data line while clear to send to the terminal is on. Any number of transitions beyond the out-of-sync noise tolerance selected by switches 402a and 402b, either two or eight mark to space transitions will cause a resynchronization cycle to occur. To inhibit this function, switches 402a and 402b are left in the open position.

The initiation of the automatic resynchronization circuit inhibits request to send to the modem and the unit 10 for the time selected by the automatic resync delay option. At the end of the automatic resynchronization delay, request to send to the modem is restored and synchronization is reinitiated. At the end of the retry time delay, if the receive side of unit 10 has not gone to the CRYPTO-R mode, a resynchronization cycle is again initiated. This option is provided in the event of a prolonged interruption of the data communication link.

The circuitry representing the retry and resync delay option comprises divider 406 and switches 408a, 408b, 410a, 410b and 410c. The LDRSNK signal is applied to frequency divider 406, which is a 24-state frequency divider and may comprise, for example, a 4521 I/C. The output of divider 406 is applied through switches 408a and 408b to NAND gate 412. The retry delay time is programmed by presetting switches 406a and 406b for a time period of either seven or twenty-five seconds. The output of divider 406 is interconnected through switches 410a, b and c to NAND gate 414. Switches 410a, b and c are preset to inhibit the request to send to the modem and the unit 10 for between 0.5 and four seconds.

The outputs of NAND gates 396, 404 and 412 are applied to NAND gate 398. The output of NAND gate 398 and the FC1 signal are applied to flip-flop 416. The output of flip-flop 416 is applied to flip-flop 418, which is interconnected to flip-flop 420. Flip-flop 420 generates the RSNK signal applied to NAND gate 414, and generates the RSNK- signal applied NAND gates 388 and 390, and the request to send control logic block 102 of FIG. 3. Flip-flop 420 is also interconnected to AND gate 422 which generates the LDRSNK signal applied to the divider 406.

If momentary to prolonged loss of TCH from the terminal or from MCI from the modem occurs, a synchronization cycle will occur. This option is referred to as the TNS new sync and is provided in order to allow the terminal to initiate the synchronization cycle. The TNS signal is applied to a receiver circuit 424, which may comprise, for example, a 75154 I/C. Circuit 424 is interconnected to TNS new sync switch 426, which applies the TNS- signal to NAND gate 428. The CTSA- signal is applied to NAND gate 429. The outputs of NAND gates 428 and 429 are applied to NAND gate 430, which through inverter 431 provides an input to shift register 432. Shift register 432 is a dual 4-bit static shift register and may comprise, for example, a 4015 I/C. The output of shift register 432 is applied to flip-flop 418.

As previously stated, the automatic resynchronization cycle is enabled by switch 116. Switch 116 is interconnected to gate 434. Gate 434 may comprise, for example, a 4501 I/C and also receives the HDCONT signal. The output of gate 434 is applied to NAND gates 396, 404 and 412 which form part of the RTS activity check, out-of-sync noise tolerance and retry delay resynchronization options. The output of gate 434 is also applied through NAND gate 436 to flip-flop 418. Automatic resynchronization is inhibited if the CLR signal, generated whenever the send section of the unit 10 is placed in the clear mode, appears through converter 438 at the resynchronization switch 116.

To summarize, a resynchronization cycle consists of the following:

1. An abnormal condition is detected by the data terminal 56, the unit 10 or the data modem 64, which initiates the automatic resynchronization circuits 118;

2. The initiation of the automatic resynchronization circuits inhibits requests to send (MCA) to the data modem 64 and the unit 10 for the time selected by the automatic resynchronization delay option (switches 410a, b, and c);

3. At the end of the automatic resynchronization delay, request to send to the data modem 64 is restored and synchronization is reinitiated; and 4. At the end of the retry delay time programmed by switches 408a and b, if the receive side of either unit 10 has not gone to the CRYPTOR mode, a resynchronization cycle is again initiated.

The following functions can cause a synchronization cycle to occur:

1. Request to send being turned on from the data terminal 56 through switch 30 (FIGS. 3 and 4a).

2. Momentary or prolonged loss of carrier detect from the modem, or mementary or prolonged loss of clear to send from the modem.

3. Momentary or prolonged loss of data terminal ready (TCD). This function can be inhibited by switch 360 (FIG. 4a).

4. Momentary or prolonged loss of data set ready (TCC). This function can be inhibited by switch 362 (FIG. 4a).

5. Momentary or prolonged loss of signal quality (CG). This function can be inhibited by switch 444 (FIG. 5b).

6. Momentary or prolonged loss of TCH from the terminal, or MCI from the modem. This function can be inhibited by switch 426 (FIG. 5a). This option is provided in order to allow the terminal to initiate a synchronization cycle. This can be used in cases where the operating system provides an out-of-sync indication.

7. Loss of activity on the clear to send control line to the terminal. If no activity is detected in the time programmed by switches 394a and b (FIG. 5b) an automatic resynchronization cycle is initiated.

8. If the mark-to-space transitions on the receive data line are not steady, the number of transitions beyond the out-of-sync noise tolerance function, selected by switches 402a and 402b (FIG. 5a), will cause a resynchronization cycle to occur.

9. A long mark signal on the receive data line will inhibit carrier detect from the data modem 64 and cause a resynchronization cycle. This function can be inhibited by leaving switches 282 and 236 (FIG. 4a) and switches 360 and 362 (FIG. 4b) in the open position.

Referring to FIG. 5b, the MCG signal quality input signal is applied to integrated circuit 442. Integrated circuit 442 may comprise, for example, a 75154 I/C and is interconnected through converter 443 to signal quality switch 444. Switch 444 provides an input to NOR gate 445. An additional input to NOR gate 445 is provided from integrated circuit 446 which receives the MCF input signal. The output of NOR gate 445 is applied to inverter 447, which through driver 448 generates the IMCF signal.

The output of NOR gate 445 is applied to NAND gate 449, which also receives an input of the SRRST- signal through switch 127 (FIG. 3). The output of NAND gate 449 is interconnected through inverter 450 to NAND gate 451. NAND gate 451 is interconnected to inverter 452 which generates the REC signal. The RCRYPT signal is applied through inverter 453, which through driver 454 generates the IRCPT signal. Inverter 453 is interconnected to NANd gate 454a, which through inverter 455 is interconnected to driver 456. Driver 456 may comprise, for example, a 75150 I/C and generates the TCF output signal. Inverter 455 is also interconnected to driver 457, which generates the ITCF output signal. Integrated circuits 442, 446, switch 444, NOR gate 445, NAND gates 449, 451, 454a, driver 456 and their associated inverters and drivers comprise the carrier detect control logic identified as block 126 in FIG. 3.

The SRCPB- signal is applied through switch 32 (FIG. 3) to NOR gate 458, which is interconnected to flip-flop 459. Flip-flop 459 comprises the clear switch identified as block 97 in FIG. 3. The output of flip-flop 459 is applied to NAND gate 454a in the carrier detect control logic 126 (FIG. 3) and NAND gates 460 and 461. The SRCPB- signal is applied through inverter 462 to NAND gate 461 which generates the CLRR- signal. NOR gate 458 and NAND gates 460 and 461 comprise the receive clear control identified as block 120 in FIG. 3.

The output of NAND gate 460 applies the CLEAR signal to NAND gate 463, which generates the CLRF- output signal. An output of the divider 406 (FIG. 5a) is applied through inverter 464 to driver 465 to generate the TSTBA output signal. NAND gate 463, inverter 464 and driver 465 comprise the alarm control and test pattern generator identified as block 112 in FIG. 3.

The receive data input buffer identified as block 94 in FIG. 3 comprises receiver 466 and flip-flop 467. The MBB signal is applied to receiver 466, which may comprise, for example, a 75154 I/C. The output of receiver 466 is applied through driver 468 to generate the IMBB output signal and to flip-flop 467 to generate the QVID output signal.

The DVID input signal is applied to flip-flop 469, which is interconnected to flip-flop 470. Flip-flop 470 applies its output signal, together with the RC- signal generated by flip-flop 459, to NAND gate 471. The RC signal generated by flip-flop 459 and the MBB signal are applied to NAND gate 472. The outputs of NAND gates 471 and 472 are applied to NAND gate 473, which generates the TBB* signal. The TBB* signal is applied through a driver 474 to a driver 475 to generate the TBB output signal. The RC signal is also applied through inverter 476 and driver 477 to generate the IRCLR output signal. The TBB* signal generated at the output of NAND gate 473 is also applied to NAND gate 478. NAND gate 478 is interconnected to NAND gate 479, which is interconnected to NAND gate 480. NAND gate 480 applies its output to inverter 481, which through driver 482 generates the ITBB output signal. Flip-flops 469 and 470, driver 475 and NAND gates 471, 472, 473, 478, 479 and 480 and their associated inverters comprise the receive data output buffer identified as block 96 in FIG. 3.

The MDD signal is applied to receiver 483, which generates the MDD- signal. The MDD- signal is applied to flip-flop 484. Receiver 483 and flip-flop 484 comprise the circuitry comprising the receive clock buffer identified by block 122 in FIG. 3. The receive clock buffer 122 synchronizes the receive clock from the data modem 64 to the internal high speed master clock.

The outputs of flip-flop 484 are applied to flip-flop 485 and NOR gate 486. Flip-flop 485 generates the RHOLD- and RHOLD signals. Flip-flop 485 is interconnected to shift register 487, which through inverter 488 is interconnected to flip-flop 489.

The RCLK signal generated by flip-flop 484 is applied through NOR gate 486 to multivibrator 490. Multivibrator 490 is a dual retrigger/reset multivibrator and may comprise, for example, a 4528 I/C. The output of multivibrator 490 is applied through inverter 491 to a driver 492 to generate the IRCLK output signal. Flip-flops 485 and 489, shift register 487, together with multivibrator 490 and their associated inverters comprise the receive clock synchronizer identified as block 124 in FIG. 3. The receive clock synchronizer 124 metes out the sixteen data clocks to the control logic 66 (FIG. 2).

CONTROL LOGIC

Figure 6:
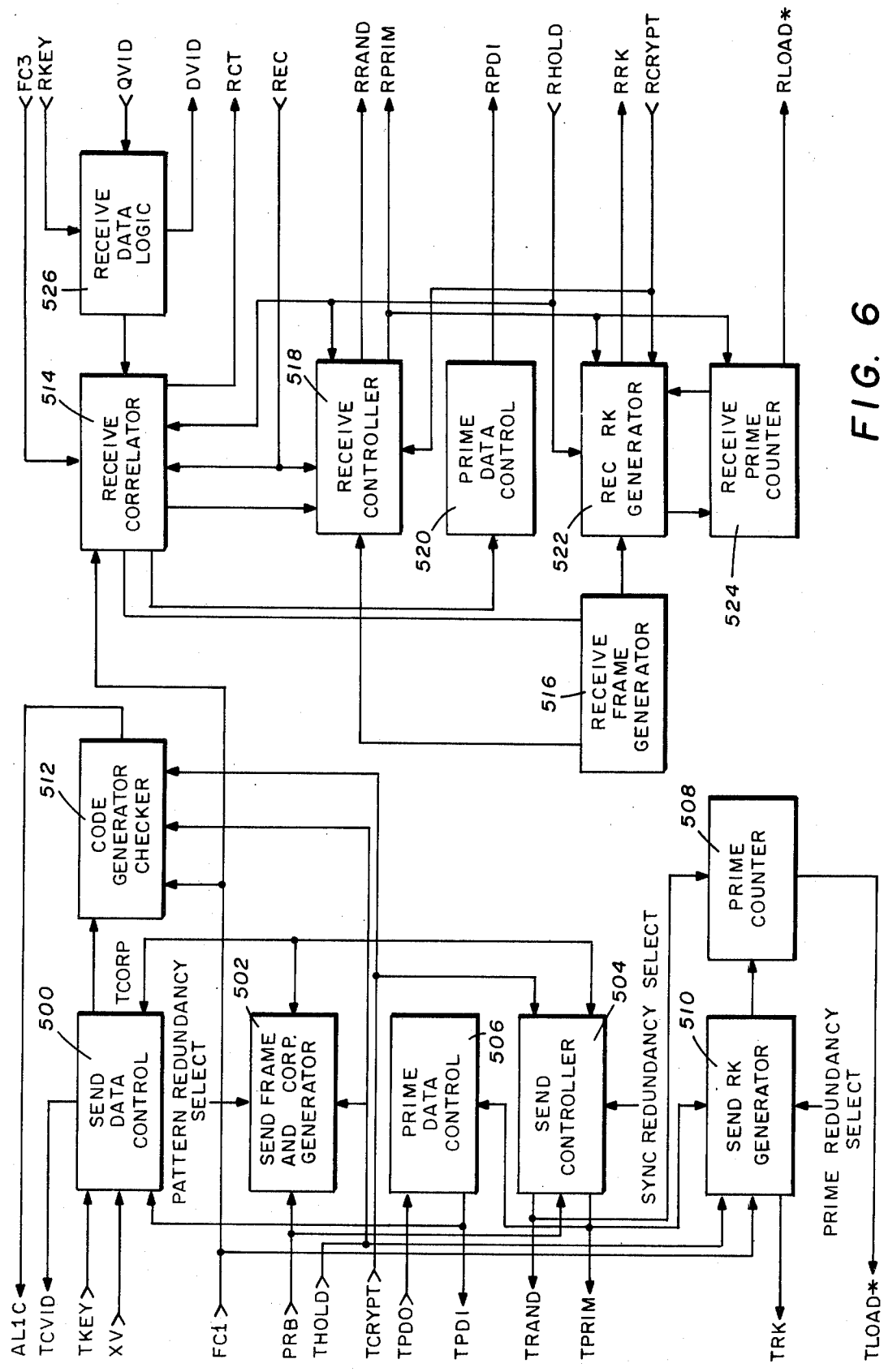
FIG. 6 is a detailed block diagram of the control of logic shown in FIG. 2.

Referring to FIG. 6, a block diagram of the control logic 66 previously described in FIG. 2 is illustrated. Referring to FIG. 6, the transmit or send portion of the controlled logic will be first described. The send data control 500 provides control gating to gate in the correct signal at the correct time during operation. The send data control 500 provides gating to correlation pattern and other logic signals, including signals transmitted to the modem. The send frame and corp generator 502 generate the frame timing signals and the correlation pattern CORP. The signal PRB is applied to the corp generator 502 and to the send controller 504 in order to initiate operation thereon.

The transmit portion of the control logic 66 operates in the frame synchronization mode wherein a specific correlation pattern is transmitted. The circuit may send out three, five or seventeen multibit correlation patterns, depending upon programming internal switches of the unit 10. The initially transmitted correlation patterns are inverted. At the end of the transmission of the predetermined number of inverted correlation patterns, the transmitting control logic will automatically send out a single upright correlation pattern. The correlation pattern comprises a fifteen or seven bit predetermined series of digital ones and zeros. The number of bits in the series is determined by programming internal switches After the end of the transmission of the upright pattern, which is termed the start pattern, the logic automatically shifts to the prime mode. During the prime mode, the prime data is transmitted from the transmitting unit to the receiving unit. The prime data is transmitted in one of three different levels of redundancy which may be programmed through switches internal to the unit 10: with fifteen bit redundancy, seven bit redundancy or with no redundancy.

During the prime mode of operation, an upright correlation pattern corresponds to a prime bit value of one and an inverted correlation pattern corresponds to a prime data bit value of zero. The prime data is received from the code generator previously described via the line TPDO and is applied through the prime data control 506 and is returned to the transmit code generator via line TPDI. Line TPDI is also routed to the send data control 500, along with the correlation pattern CORP. At the send data control 500, the prime data and the correlation pattern are modulo-2 added together to provide the inverted and noninverted correlation patterns for the transfer of prime data to the receiving unit. Each time a correlation pattern is transmitted, the prime counter 508 accumulates one count. At the same time, at the end of each correlation pattern, the send RK generator 510 generates one request for key so that the code generator will transmit the next prime data bit. Once the prime counter 508 has counted to its completion of twenty-five bits, the prime counter 508 transmits a signal TLOAD* to the key variable storage logic to be subsequently described.

The code generator check 512 checks the data being transmitted in order to detect a condition wherein a logic one or zero is stuck in the system. Such a malfunction is indicated by a constant relationship between the input and output data of the modulo-2 enciphering gate which is contained in the send data control 500. If the signals remain constant for 256 continuous bits, the code generator checker 512 is initiated and cuts off the transmit data coming from the terminal and also cuts off the clear to send signal applied to the terminal to terminate operation.

In addition, at the beginning of a cycle when frame synchronization is being transmitted, the code generator checker 512 is forced into a test mode to insure that it will operate satisfactorily.

Referring now to the receive portion of the control logic, the receive correlator 514 detects the correlation patterns transmitted from a remote transmitter. The receive correlator 514 detects the inverted correlation patterns and in response thereto generates an output AL1. When the complete correlation pattern has been detected and is acceptable, the receive frame generator 516 in turn generates a signal RENDW. The receive controller 518 detects two inverted correlation patterns in succession that are perfectly received and then looks for an upright correlation pattern which is received according to a majority decision basis only. The RRAND signal is then turned off and a RPRIM signal is turned on by the receive controller 518. The prime data control 520 selects whether or not redundancy in the correlation pattern is utilized.

When the correlation pattern redundancy is utilized, a signal MD in combination with the signal RENDW is utilized to form a signal CGD. If no redundancy is selected, then the signal QVID is utilized by the prime data control 520. In either case, the output of prime data control is RP (receive prime) data input or RPDI. The receive RK generator 522 is interconnected to generate an RK signal to the code generator each time a bit of prime data is received or a new key bit is required. The receive prime counter 524 operates in a similar manner as the prime counter 508. The receive data logic 526 receives the RKEY and QVID signals and applies a signal to a modulo-2 gate to provide the output signal DVID which is applied to the output data buffer. Receive logic 526 thus operates to provide deciphering of the received enciphered signal.

Figure 7:
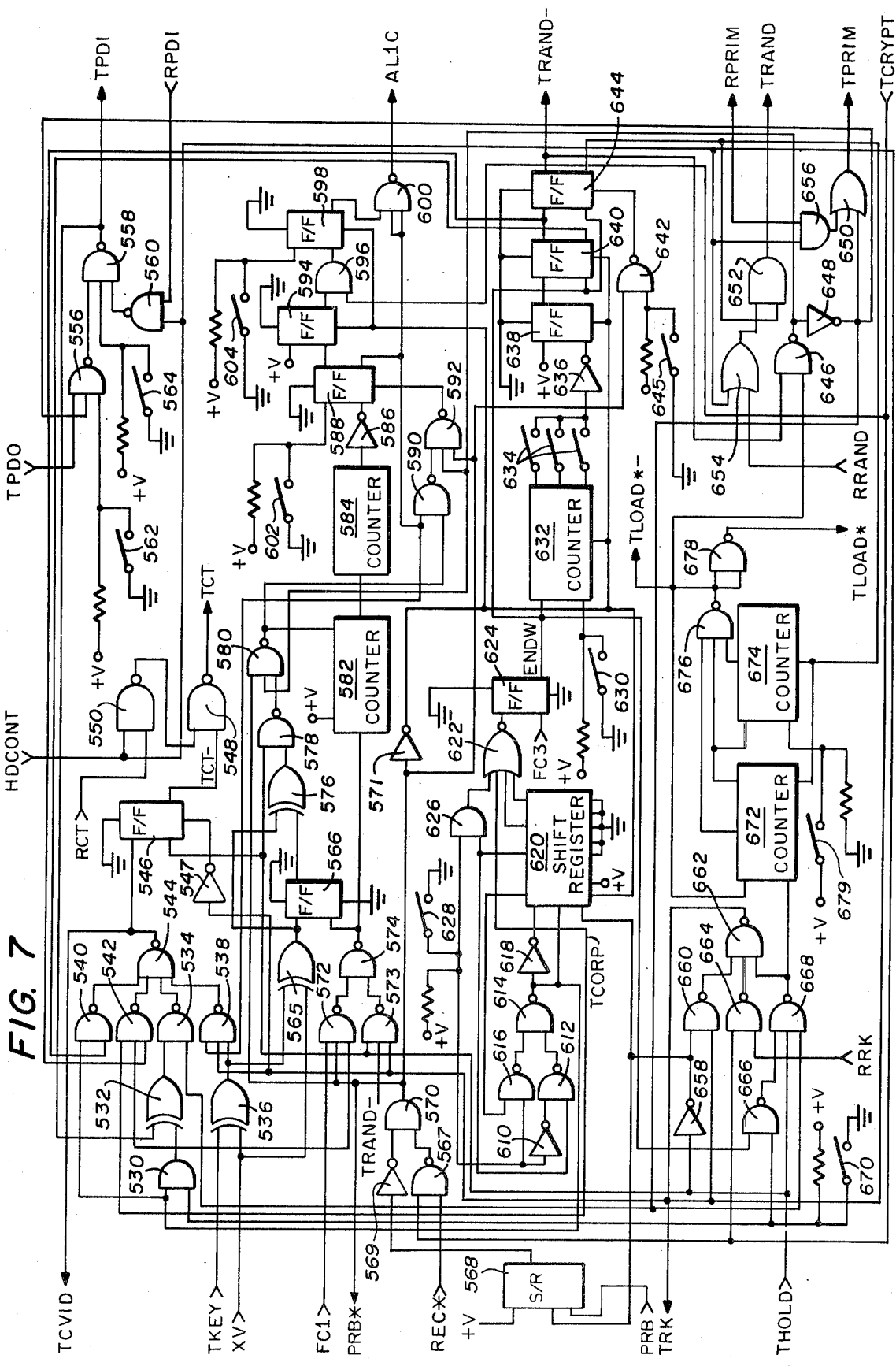

FIG. 7 illustrates the schematic circuitry which corresponds to the send controller system represented by blocks 500-512 in FIG. 6. AND gate 530 is interconnected to an EXCLUSIVE OR gate 532, which is interconnected to NAND gate 534. EXCLUSIVE OR gate 536 receives the TKEY and XV signals and applies its output to NAND gate 538. AND gate 530 is also interconnected to NAND gate 540, which together with NAND gates 542, 534 and 538 provide inputs to NAND gate 544. The output of NAND gate 544 is applied to flip-flop 546, which receives a second input through inverter 547. Flip-flop 546 generates the TCT-signal which is applied to NAND gate 548. The RCT and HDCONT signals are applied to NAND gate 550. The output of NAND gate 550 is applied to NAND gate 548, which generates the TCT output signal. The EXCLUSIVE OR gates 532 and 536, together with NAND gates 534, 538, 540, 542, 544, 548 and 550, AND gate 530 and flip-flop 546, comprise the send data control circuitry represented by block 500 in FIG. 6. The send data control 500 essentially provides the gating function, to gate in the proper signal at a proper time.

NAND gate 556 receives the TPDO signal and is interconnected to NAND gate 558 which generates the TPDI signal. The RPDI signal is applied to NAND gate 558 through NAND gate 560. The three NAND gates 556, 558 and 560 comprise the prime data control circuit represented by block 506 in FIG. 6. The prime data control circuit has test mode capability. The prime data generated from the code generator send 80 is routed immediately back to the code generator send 80 through the TPDI signal. The TPDO signal goes through gating which is controlled by internal switches 562 and 564. Switch 562 forces all zeros and switch 564 forces all ones in the prime data for test purposes.

EXCLUSIVE OR gate 565 receives the XV signal and output of EXCLUSIVE OR gate 536 and is interconnected to flip-flop 566. The REC* signal is applied to NAND gate 567. The PRB signal is applied to a 4-bit shift register 568, which may comprise, for example, a 4015 I/C. The output of shift register 568 is applied through inverter 569 to AND gate 570, which generates the PRB* signal. AND gate 570 is also interconnected to inverter 571. NAND gates 572 and 573 are interconnected to flip-flop 568 through NAND gate 574. EXCLUSIVE OR gate 565 is also interconnected to EXCLUSIVE OR gate 576, which is interconnected through NAND gate 578 to NAND gate 580. NAND gate 574 and NAND gate 580 are interconnected to counter 582. Counter 582 is a four stage binary counter and is interconnected to a second four stage binary counter 584. Counter 584 is interconnected through inverter 586 to flip-flop 588. NAND gate 580 is interconnected through NAND gates 590 and 592 to flip-flop 588. Flip-flop 588 is also interconnected to flip-flop 594, which is interconnected through AND gate 596 to flip-flop 598. The ALIC signal is generated by flip-flop 598 through NAND gate 600. Switches 602 and 604 are internal alarm inhibit switches. The flip-flops 566, 588, 594 and 598, together with counters 582 and 584 and gates 565, 576, 578 and 580 and their associated circuitry, comprise the code generator checker represented by block 512 in FIG. 6.

The code generator checker 512 checks the operation of the code generator send 80 and looks for a stuck one or a stuck zero position. A stuck one or a stuck zero condition would be indicated by a constant relationship between the input and output data of the input and output signals of the modulo-2 enciphering data which is contained in the send data control 500. If the input and output data stays constant for 256 continuous bits, the code generator checker 512 will be actuated, which will in turn cut off the transmit data coming from the terminal and cut off the clear to send to the terminal.

Inverter 610 is interconnected through NAND gate 612 to NAND gate 614. NAND gate 616 also provides an input to NAND gate 614. The output of NAND gate 614 is interconnected through an inverter 618 to a four stage shift register 620. Shift register 620 is interconnected to OR gate 622 which in turn is interconnected to flip-flop 624. Inverter 610 is also interconnected to AND gate 626, which is interconnected to OR gate 622. The shift register 620, flip-flop 624, OR gate 622 and their associated circuitry comprise the send frame and corp generator identified as block 502 in FIG. 6. The shift register 620 and associated logic controls can operate in the modulo-7 or modulo-15 modes of operation. The mode of operation is controlled using the send redundancy select switch 628. The send frame and corp generator 502 generates the TCORP and ENDW signals. Switch 630 is used in the test mode.

Counter 632 is interconnected through the sync pattern redundancy select switches 634 to inverter 636. Inverter 636 is interconnected to flip-flop 638, which in turn is interconnected to flip-flop 640. Flip-flop 640 and NAND gate 642 are interconnected to flip-flop 644, which generates the TRAND- signal. Switch 645 is used in the test mode. Flip-flop 644 is also interconnected to NAND gate 646, which through inverter 648 is interconnected to OR gate 650. OR gate 650 generates the TPRIM signal. Flip-flop 644 is also interconnected to OR gate 652 which generates the TRAND signal. OR gate 654 provides a second input to AND gate 652. AND gate 656 receives the RPRIM signal and provides an input to OR gate 650 and is interconnected to OR gate 654. The four stage binary counter 632, flip-flops 638, 640 and 644, together with AND gate 652 and OR gate 650 and their associated gates comprise the electronic circuitry for the send controller represented by block 504 in FIG. 6. The send controller is clocked essentially by the ENDW signals.

Inverter 658 provides an input to shift register 568 and is interconnected to NAND gate 660, which provides an input to NAND gate 662. A second input to NAND gate 662 is provided by NAND gate 664. NAND gate 666 is interconnected through NAND gate 668 which receives the THOLD signal to provide a third input to NAND gate 662. NAND gate 662 generates the TRK signal. The prime redundancy select switch 670 is interconnected to NAND gate 666. The inverter 658 and NAND gates 660, 662, 664, 666 and 668 comprise the send RK generator circuit represented in FIG. 6 by block 510. The send RK generator 510 generates the RK signal to the code generator send 80 in the proper timing in response to signals from the send frame and corp generator 502 and the send controller 504. The send prime redundancy select switch 670 selects whether the prime data is transmitted with redundancy or with no redundancy.

NAND gate 668 is interconnected to a four stage binary counter 672, which is interconnected to a second four stage binary counter 674. Counter 674 is interconnected to a NAND gate 676, which generates the TLOAD*- signal, and which through NAND gate 678 generates the TLOAD* signal. Switch 679 is used in the test mode. The counters 672 and 674, together with NAND gates 676 and 678 comprise the circuitry represented as the prime counter, block 508 in FIG. 6.

Figure 8:
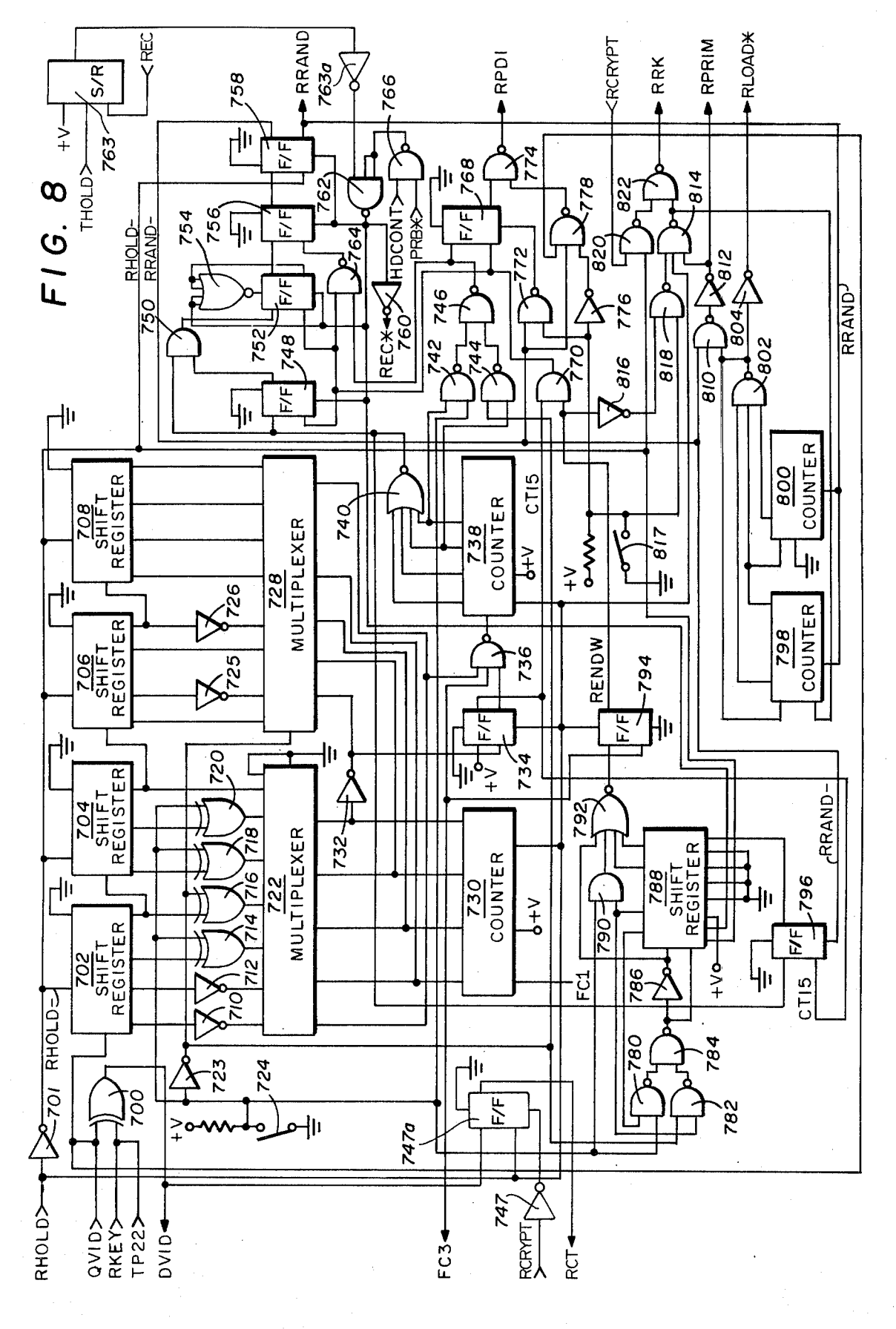

FIG. 8 illustrates the electronic circuitry represented by blocks 514 through 526 previously shown in FIG. 6. Referring to FIG. 8, the receive data logic block 526 (FIG. 6) is composed of an EXCLUSIVE OR gate 700. EXCLUSIVE OR gate 700 has as its input the randomized key string RKEY and the receive data QVID signal. The gate decodes by modulo-2 addition and the output is the DVID signal, which is transmitted to the receive data output buffer 96 (FIG. 3).

The QVID signal and the RHOLD signal, through inverter 701, are applied to shift register 702, which is a four stage shift register. Shift register 702 is interconnected to shift register 704, which is interconnected to shift register 706, which in turn is interconnected to shift register 708. The shift registers 702, 704, 706 and 708 are four stage shift registers and detect the transmitted correlation pattern. Shift registers 702 and 704 are interconnected through inverters 710 and 712, and are connected through EXCLUSIVE OR gates 714, 716, 718 and 720 to a multiplexer 722. Inverter 723 is interconnected to the receive redundancy select switch 724.

Shift register 706 is interconnected through inverters 725 and 726 to a multiplexer 728. Shift register 708 is interconnected to multiplexer 728. Inverter 723 also provides an input to multiplexer 728. The output of multiplexers 722 and 728 are applied to counter 730 which is a four stage binary counter. This circuitry operates to detect the correlation pattern in the receive mode. Multiplexers 722 and 728 are also interconnected through inverter 732, which is interconnected to flip-flop 734.

Flip-flop 734 is interconnected to NAND gate 736, which also has an input from multiplexer 728. The output of NAND gate 736 is interconnected to counter 738. Counter 738 is a four stage binary counter, which has its output applied to OR gate 740 and NAND gates 742 and 744. The outputs of NAND gates 742 and 744 are interconnected to NAND gate 746. Inverter 747 receives the RCRYPT signal and is interconnected to flip-flop 747a to generate the RCT signal. The shift registers 702, 704, 706 and 708, together with multiplexers 722 and 728, and counters 730 and 738 and their associated circuitry comprise the receive correlator identified in FIG. 6 as block 514.

The output from the OR gate 740 is applied to flip-flop 748, which is interconnected through AND gate 750 to flip-flop 752. Flip-flop 752 has an inverted input supplied by NOR gate 754. Flip-flop 752 is also interconnected to flip-flop 756, which is interconnected to flip-flop 758. Flip-flop 758 generates the RRAND signal. Flip-flops 756 and 758 are interconnected and generate the RRAND signal. Inverter 760 is also interconnected to NAND gate 762, which generates the REC* signal. NAND gate 762 is interconnected to a four bit shift register 763, such as a 4015 I/C, through inverter 763a. Shift register 763 receives the THOLD and REC signals. The output of NAND gate 746 is interconnected to NAND gate 764 to supply an input to flip-flop 756. The HDCONT and PBR* signals are applied through NAND gate 766 as an input to NAND gate 762. The flip-flops 748, 752, 756 and 758 and their associated components comprise the receive controller identified as block 518 in FIG. 6.

The output from NAND gate 746 is also interconnected to flip-flop 768, which also receives as inputs the outputs of AND gate 770 and NAND gate 772. The output of flip-flop 768 is applied to NAND gate 774, which generates the RPDI signal. A second input to NAND gate 774 is applied from inverter 776 through NAND gate 778. The flip-flop 768 and AND gate 770, together with NAND gates 772 and 774, and inverter 776, comprise the prime data control circuitry represented by block 520 in FIG. 6.

The outputs from NAND gates 780 and 782 are applied as inputs to NAND gate 784. The output of NAND gate 784 is applied directly to and through an inverter 786 to shift register 788. Shift register 788 is a four stage shift register, which is interconnected through AND gate 790 and OR gate 792 to flip-flop 794. The output of OR gate 740 is also interconnected to shift register 788 through flip-flop 796. The shift register 788, together with flip-flops 794 and 796 and their associated circuitry, comprise the receive frame synchronizer identified in FIG. 6 as block 516. OR gate 792 generates the RENDW signal which is applied through flip-flop 794 to AND gate 770 in the prime data control circuit 520 (FIG. 6). The flip-flop 758 generates the RRAND- signal which is applied to NAND gates 772, 778 and 810, and flip-flop 796.

The RAND signal is applied to counters 798 and 800. Counters 798 and 800 are four stage binary counters having outputs applied to NAND gate 802. NAND gate 802 has its output applied through an inverter 804 to generate the RLOAD* signal. The counters 798 and 800, gate 802 and inverter 804 comprise the receive prime counter circuitry represented in FIG. 6 by block 524.

The output from NAND gate 802 is also applied to NAND gate 810, which through inverter 812 generates the RPRIM signal. The output of inverter 812 is applied to NAND gate 814, which also is interconnected to counter 738. A third input to NAND gate 814 is supplied from AND gate 770 through inverter 816 and the prime redundancy switch 817 both interconnected to NAND gate 818. The outputs of NAND gate 814 and NAND gate 820 are interconnected to NAND gate 822 to generate the RRK signal. NAND gates 810, 814, 818, 820 and 822, together with inverters 812 and 816 comprise the receive RK generator represented by block 522 in FIG. 6. The receive RK generator 522 performs essentially the same function as the send RK generator. The receive generator 522 generates an RK signal to the code generator receive 78 (FIG. 2) each time a bit of prime data is received or a new key bit is required.

Key Variable Storage

Figure 9:
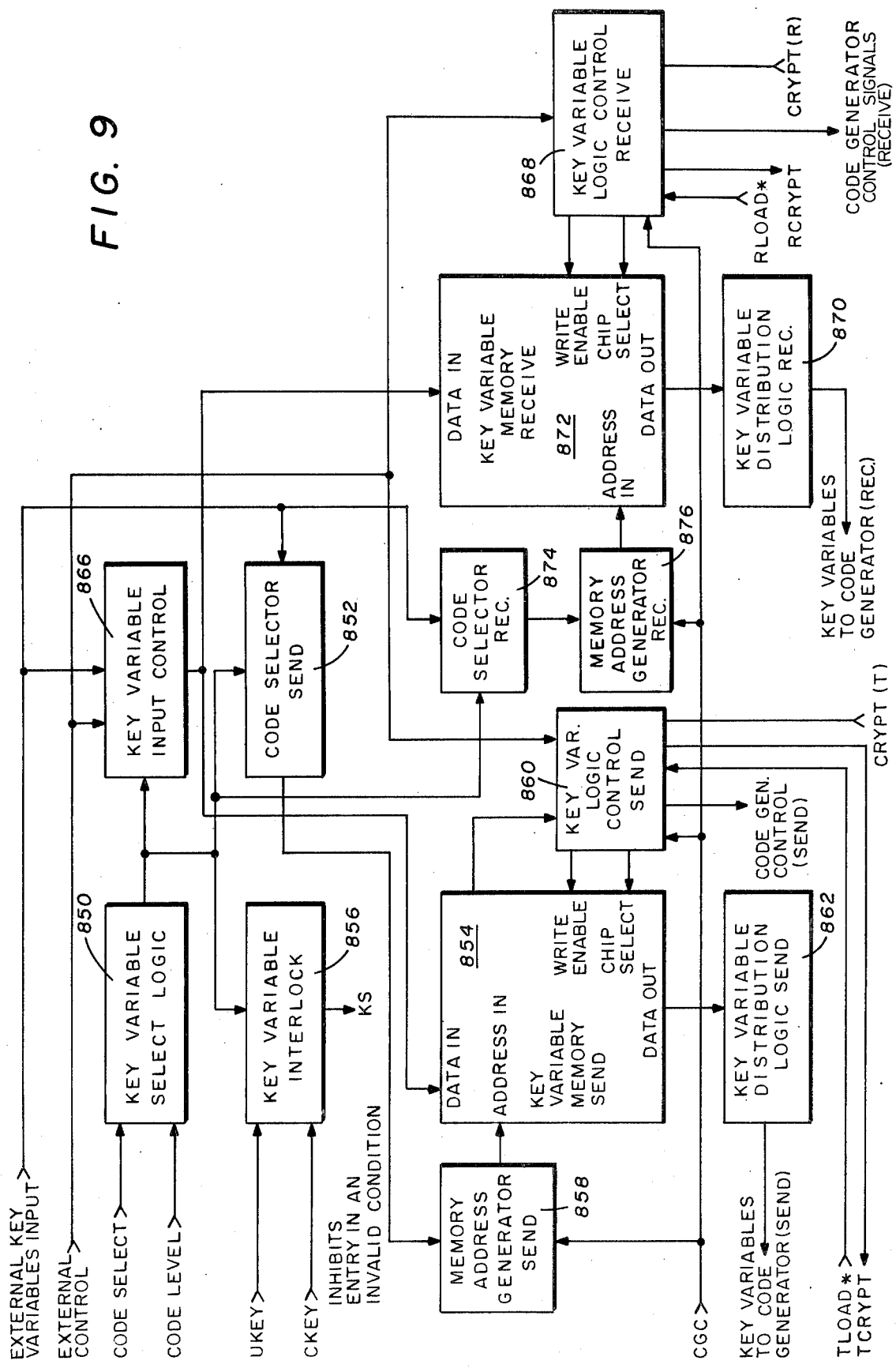
FIG. 9 is a block diagram of the key variable storage circuit shown in FIG. 2.

FIG. 9 is a block diagram of the key variable storage circuit 68 as previously shown in FIG. 2. The key variable storage circuitry includes a transmitting and receiving section. The key variable select logic 850 receives the control signals from the front panel of the unit 10 which are generated by operation of the code selector switches 14 and 18 and converts the signals into binary signals which are usable by the code selector send circuit 852. The code selector send circuit 852 loads in new key variables into the send key variable memory 854.

The key variable interlock 856 prevents the key variables from being entered if the operator has not used the correct procedure for entering into the front panel of the unit 10. For example, the key variable interlock prevents the entering of a custom code with the use of only a universal code key lock being turned on, or in the reverse, if a universal code is attempted to be entered with only the custom lock turned on. The send code selector 852 responds to information from the key variable select logic and converts the information into addresses which are used by the memory address generator 858.

The memory address generator send 858 comprises a set of counters which successively address key variable memory send 854 to either write in or read out the key variable into or from memory. These memory addresses are utilized to address the memory 854.

A key variable logic control send circuit 860 controls the operation of the key variable logic by synchronizing the enter signal for entering of the key variable data into the front panel of the unit 10. In addition, the logic control 860 contains a delay circuit which delays for a number of data bits before the system enters the encrypt mode. This function is accomplished by measuring a fixed amount of time from when the key load start signal goes high until the time the TCRYPT signal is generated for the remainder of the system. During this period of time, the code generator send 80 (FIG. 2) of the system is loading variables from the key variable memory 854. Once the loading of these variables is completed, then the code generator 80 (FIG. 2) initiates an initialization phase.

The key variable distribution logic send 862 receives the serial data stream coming out of the memory 854 and converts it into five parallel output data streams which are applied to the code generator send 80 (FIG. 2). The memory 854 is a random access memory which is addressed by the memory address generator send 858 and the code selector send 852 in order to generate the write stream of data bits for the code generator.

The key variable input control 866 is responsive to the external key variable input and the external control in order to control the operation of either the transmit or receive section of the circuit. The key variable logic control receive 868 receives the RLOAD* signal in order to generate a load signal to the code generator, thereby placing the code generator in the load mode wherein key variable signals selected from the front panel of the unit are transferred from memory to the code generator via the key variable distribution logic 870. The code variable information is stored in the key variable memory receive 872. After this data has been transmitted to the code generator, the key variable logic control receive 868 generates a load complete signal and the code generator is signaled to begin its initialization mode. The code selector receive 874 receives binary signals from the key variable select logic 850 and generates signals to the memory address generator 876 for accessing the memory 872.

Figure 10:
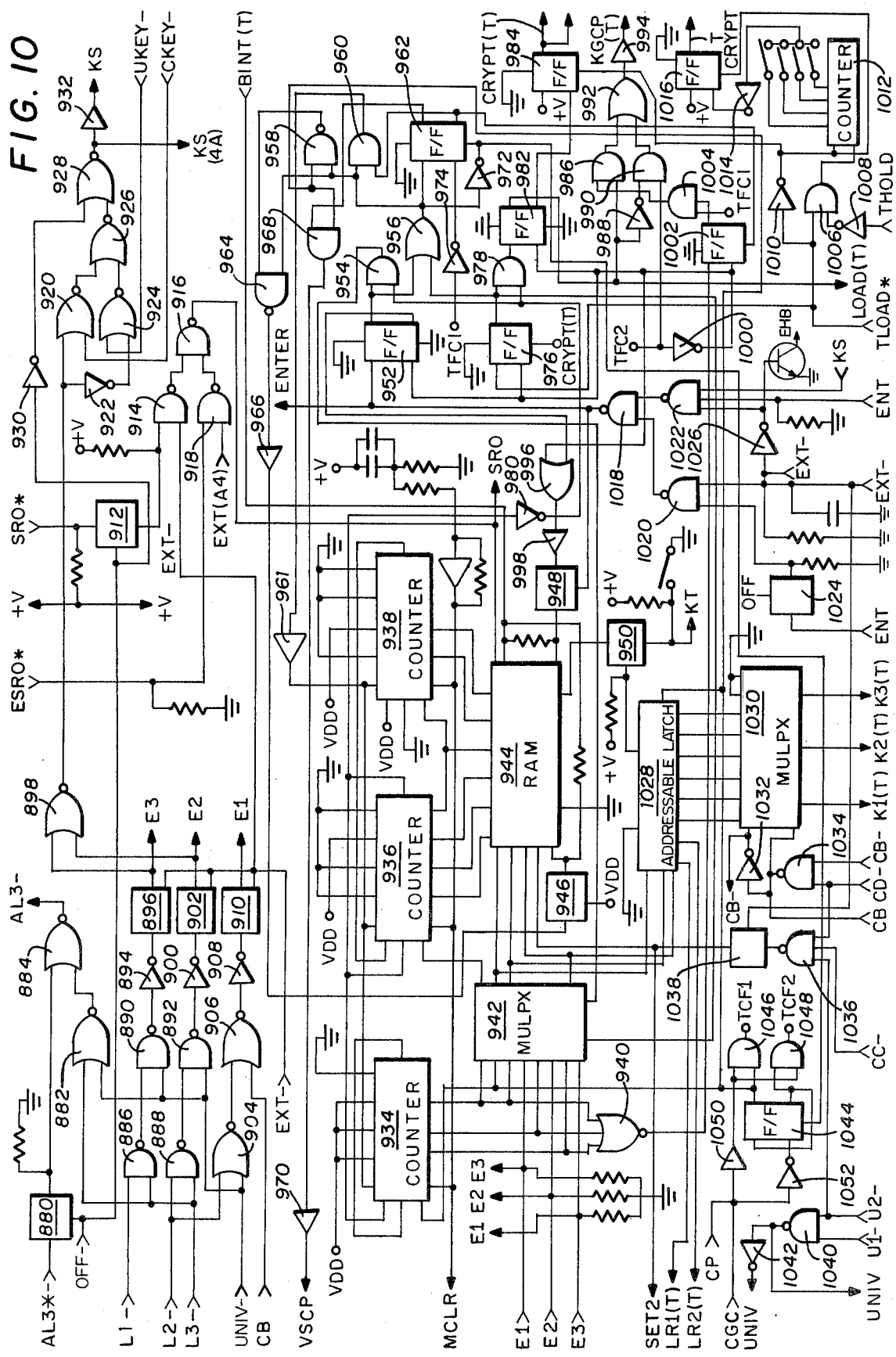
FIG. 10 is a schematic diagram of the key variable storage circuit shown in block diagram in FIG. 9.

The block diagram shown in FIG. 9 will now be described in greater detail with respect to the schematic circuitry shown in FIG. 10. The AL3*- signal is applied to analog gate 880. The output of gate 880 and NOR gate 882 provide inputs to NOR gate 884 which generates the AL3- signal. NAND gates 886 and 888 receive the L1-, L2- and L3- signals. The outputs of NAND gates 886 and 888 are interconnected to NAND gates 890 and 892. NAND gate 890 is interconnected through inverter 894 to analog gate 896. Analog gate 896 is interconnected to provide an input to NOR gate 898. NAND gate 892 is interconnected through inverter 900 to analog gate 902, which also provides an input to NOR gate 898. The UNIV- signal is applied to NOR gate 904, which is interconnected to NOR gate 906. NOR gate 906 is interconnected to inverter 908 to analog gate 910. Analog gates 896, 902 and 910 generate the E3, E2 and E1 signals, respectively. The analog gates 880, 896, 902 and 910, together with NAND gates 886, 888, 890, and 892, and NOR gates 882, 884, 898, 904 and 906 comprise the circuitry for the key variable select logic circuit represented by block 850 in FIG. 9.

Analog gate 880 is interconnected to analog gate 912 which also receives the SRO* signal. Analog gate 912 is interconnected to NAND gate 914, which is interconnected to NAND gate 916. NAND gate 918 receives the ESRO* signal and is interconnected to NAND gate 916. The analog gate 912 and NAND gates 914, 916 and 918 comprise the key variable input control circuitry represented by block 866 in FIG. 9.

NOR gate 898 is interconnected to NOR gate 920, and through inverter 922 for interconnection to NOR gate 924. The outputs of NOR gates 920 and 924 are interconnected to NOR gate 926 which is interconnected to NOR gate 928. A second input to NOR gate 928 is provided from the OFF- signal through inverter 930. The output of NOR gate 928, through driver 932, generates the KS signal. NOR gates 920 and 924 receive the CKEY- and UKEY- signals. The NOR gates 920, 924, 926 and 928, together with inverters 922 and 930, comprise the key variable interlock circuitry represented by block 856 in FIG. 9. The key variable interlock 856 prevents the key variables from being entered into the unit 10 if the operator has not used the correct procedure for entering into the front panel.

The memory address generator send circuitry represented by block 858 in FIG. 9 comprises binary counters 934, 936 and 938. These counters successively address key variable memory send to either write in, or read out the key variable into or from memory.

Counter 934 is interconnected to NOR gate 940 and multiplexer 942. The multiplexer 942 is a quad two input multiplexer and comprises with NOR gate 940 the code selector send circuitry represented by block 852 in FIG. 9.

Counters 936 and 938 are interconnected to random-access memory (RAM) 944. RAM 944 is interconnected to analog gates 946, 948 and 950, which together with RAM 944 comprise the key variable memory send circuitry represented by block 854 in FIG. 9.

Flip-flop 952 is interconnected to AND gate 954, which is interconnected to OR gate 956. OR gate 956 provides an input to NAND gates 958 and 964, AND gate 960 and flip-flop 962. NAND gate 958 is interconnected to NAND gate 964, which through driver 966 is interconnected to analog gate 946. NAND gate 958 is also interconnected to AND gate 968, which through driver 970 generates the VSCP signal. The output of OR gate 956 is applied through inverter 972 to flip-flop 962. The TFC1 signal is applied through inverter 974 to flip-flop 962. The output of AND gate 960 is applied through driver 961 to counter 938.

The CRYPT(T) signal is applied to flip-flop 976, which is interconnected to AND gate 978. A second input to AND gate 978 is applied through inverter 980 from counters 934 and 936. AND gate 978 is interconnected to flip-flop 982, which is interconnected to flip-flop 984 to generate the CRYPT(T) signal. Flip-flop 982 is also interconnected to AND gate 986, and through inverter 988 to AND gate 990. AND gates 986 and 990 are interconnected to OR gate 992, which through driver 994 generates the KGCP(T) signal. Flip-flop 982 is also interconnected to OR gate 996, which through driver 998 is interconnected to analog gate 948. Flip-flop 982 also generates the LOAD(T) signal. The TFC2 signal is applied through inverter 1000 to flip-flop 1002, which is also interconnected to flip-flop 982 and OR gate 996. Flip-flop 1002 is interconnected to AND gate 1004, which is further interconnected to AND gate 986.

Flip-flop 976 receives the TLOAD* signal and is further interconnected to AND gate 1006. AND gate 1006 is interconnected to inverter 1008, which receives the THOLD signal. AND gate 1006 is also interconnected through inverter 1010 to flip-flop 984. AND gate 1006 is interconnected to a four stage binary counter 1012, which is interconnected through inverter 1014 to flip-flop 1016. Flip-flop 1016 generates the TCRYPT signal.

Flip-flop 952 receives an input from NAND gate 1018, which is interconnected to NAND gates 1020 and 1022. NAND gate 1020 is interconnected to analog gate 1024 which receives the ENT signal. NAND gate 1020 also receives the EXT- signal, and is interconnected through inverter 1026 to the base of transistor 1027 to generate the EHB signal. Flip-flops 952, 962, 976, 982, 984, 1002 and 1016, counter 1012, together with their associated gates, comprise the key variable logic control send circuitry represented by block 860 in FIG. 9. The key variable logic control send circuit 860 controls the operation of the key variable logic by synchronizing the enter signal for entering of the key variable data from the front panel of the unit 10 into the memory and also controls the loading of these variables into the key generator send. In addition, the logic control 860 contains a delay circuit which delays a number of data bits before the system enters the encrypt mode.

RAM 944 is interconnected to an addressable latch circuit 1028, which is interconnected to multiplexer 1030. Multiplexer 1030 is a quad-two input multiplexer which generates the K1(T), K2(T) and K3(T) signals. Multiplexer 1030 is interconnected through inverter 1032 to receive the CB signal, and is interconnected to NAND gate 1034 to receive the CD- and CB- signals. NAND gate 1034 is interconnected to NAND gate 1036 which receives the CC- signal. NAND gate 1036 is also interconnected to RAM 944 through analog gate 1038. NAND gate 1036 receives the U2- signal which is also applied to NAND gate 1040. NAND gate 1040 through inverter 1042 generates the UNIV signal. Addressable latch 1028 is interconnected to flip-flop 1044. Flip-flop 1044 is interconnected to NAND gates 1046 and 1048, which generate the TCF1 and TCF2 signals. NAND gate 1046 is interconnected to driver 1050 to receive the CGC signal. The addressable latch 1028, multiplexer 1030, analog gate 1038 and their associated circuitry comprise the key variable distribution logic send circuitry represented by block 862 in FIG. 9.

The receiving section of the key variable storage circuitry includes the code selector 874, memory address generator 876, key variable memory 872, key variable logic control 868 and the key variable distribution logic 870 circuitry represented in FIG. 9. The circuitry comprising these individual functions is identical to the circuitry in the send section of the key variable storage circuit. For example, the key variable memory receive 872 circuitry is identical to the key variable memory send 854 circuitry described above in connection with FIG. 10. Similarly, the code selector 874, memory address generator 876, key variable logic control 868 and the key variable distribution logic 870 circuits are identical to the code selector send 852, memory address generator send 858, key variable logic control 860 and the key variable distribution logic 862, respectively.

Figures 11, 12, 13, 14:
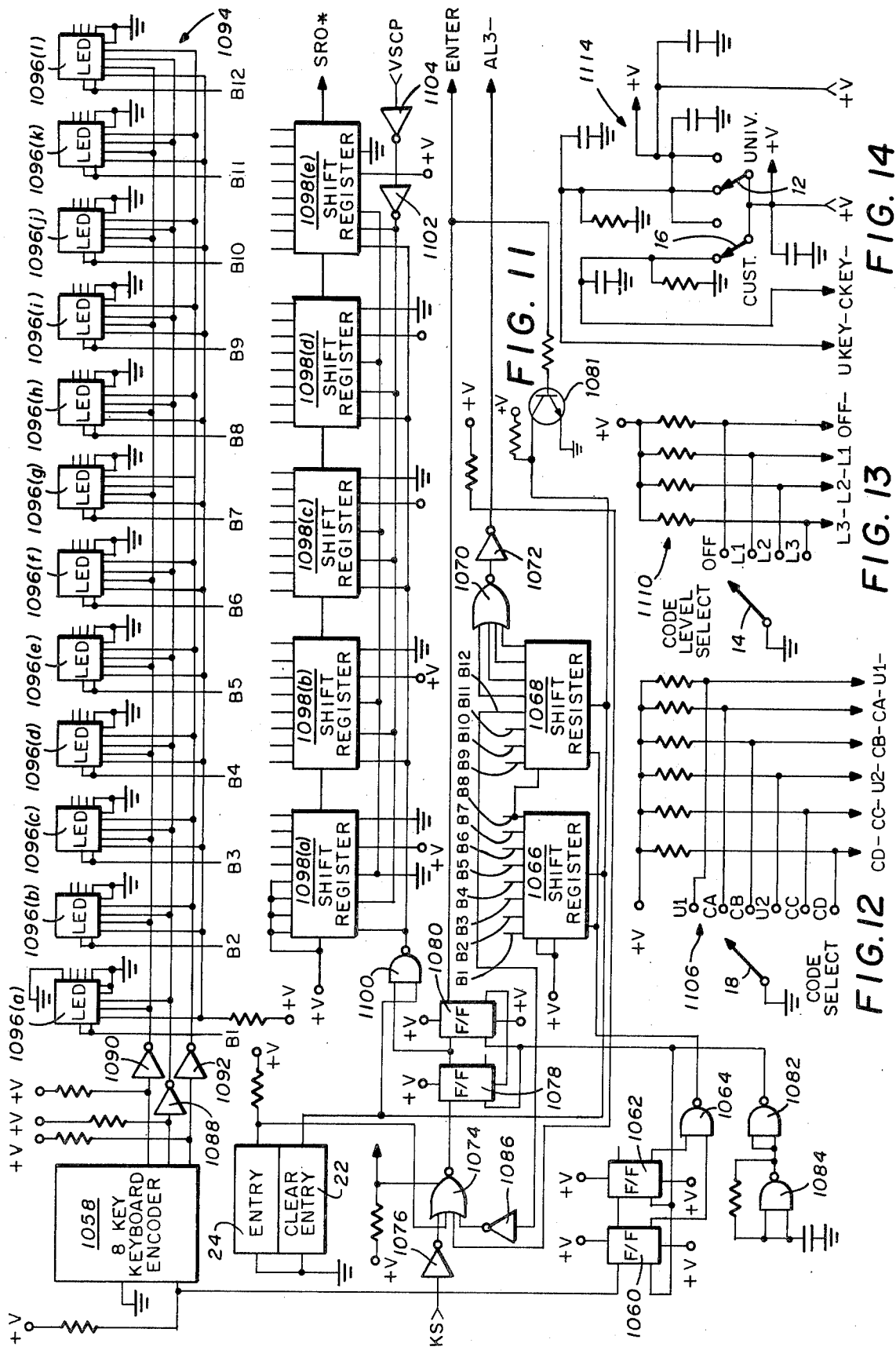
FIG. 11 is a detailed schematic diagram of the key variable entry keyboard and logic shown in FIG. 2.
FIG. 12 is a schematic diagram of the code select circuitry shown in FIG. 2.
FIG. 13 is a schematic diagram of the code variable select circuitry shown in FIG. 2.
FIG. 14 is a schematic diagram of the custom and universal key switches shown in FIG. 1.

Referring to FIG. 11, schematic circuitry is shown representing the key variable entry keyboard and logic, block 74 and the display and memory block 76 in FIG. 2. The key variable entry keyboard and logic 74 comprises the keyboard circuitry 1058, which is an eight key keyboard encoder, having keyboard push-button switches 20 (FIG. 1). The key variable entry keyboard and logic 74 further comprises push-button switches 24 and 22 and logic and debounce circuitry to control the key variable entry. The entry keyboard 1058 is interconnected to flip-flop 1060, which is interconnected through flip-flop 1062. Flip-flops 1060 and 1062 are interconnected through NAND gate 1064 to shift registers 1066 and 1068. The shift registers 1066 and 1068 indicate to the keyboard 1058 which digit is being entered next in the display. Shift register 1068 is interconnected to OR gate 1070, which through inverter 1072 generates the AL3- signal.

The push-button entry switch 24 is interconnected to NOR gate 1074, which through inverter 1076 receives the KS signal. NOR gate 1074 is also interconnected to flip-flop 1078, which is interconnected to flip-flop 1080, which generates the ENTER signal. The ENTER signal is also applied to shift registers 1066 and 1068 through transistor 1081. A second input to flip-flops 1078 and 1080 is provided by NAND gate 1082 which is interconnected to NAND gate 1084. NOR gate 1074 is also interconnected through inverter 1086 to shift register 1068. The eight key keyboard encoder 1058, push-button switches 22 and 24, shift registers 1066 and 1068, together with their associated circuitry, comprise the key variable entry keyboard and logic represented by block 74 in FIG. 2.

The eight key keyboard encoder 1058 is also interconnected through inverters 1088 and 1090 and 1092 to the light emitting diode array identified generally by the numeral 1094. The light emitting diode array consists of twelve light emitting diode assemblies identified as 1096(a)-(l). Each light emitting diode assembly in the array 1096 corresponds to one of the digit positions in the display 26 in FIG. 1. Light emitting diode assemblies 1096(a)-(h) are interconnected to shift register 1066, and light emitting diode assemblies 1096(i)-(l) are interconnected to shift register 1068. The light emitting diode array 1094 comprises the display portion of block 76 in FIG. 2.

The memory portion of the display and memory block 76 in FIG. 2 comprises the internal LED latches and the shift registers 1098(a)-(e). The shift registers 1098(a)-(e) are interconnected to the light emitting diodes of array 1094 and receive the output of NAND gate 1100. Input to NAND gate 1100 is supplied by flip-flops 1078 and 1080 in the key variable logic circuitry and the CLEAR ENTRY push-button switch 22. The shift registers 1098(a)-(e) are also interconnected to inverter 1102, to receive through inverter 1104 the VSCP signal.

At initial entry, the shift registers 1066 and 1068 are all set at zero. The code is entered by entering twelve digits through the keyboard 20 by depression of the various keys. This causes the output lines 1, 2 and 4 from the eight key keyboard 1058 to be activated in accordance with the binary code, which drives all the light emitting diodes in array 1094. Upon depression of a key in the keyboard 20, a pulse is generated which causes the shift registers 1066 and 1068 to increment one pulse. When the shift registers 1066 and 1068 increment one pulse, this causes that particular readout to lock the information contained on the lines 1, 2 and 4 and to display the number that was depressed in the corresponding position in display 26. This procedure continues until all twelve digits have been entered.

If during entry, an error is made in entering a digit, the clear entry push-button switch 22 upon depression will reset the shift registers 1066 and 1068 back to the zero state and clear the display 26. Once the twelve digits have been entered the entry push-button switch 24 is depressed. This operation causes a transfer from the memory of the display and memory circuitry to the key variable storage circuitry represented by block 68 in FIG. 2. A reset pulse then causes the shift registers 1066 and 1068 to be reset back to the zero level. This pulse also clears the memory circuits of the shift registers 1098(a)-(e) by shifting the data onto the SRO* line, under the control of the VSCP clock pulses.

Referring to FIG. 12, the circuitry representing the code select switch 18 (FIG. 1) is diagrammed and generally referred to as 1106. The switch 18 can be positioned to the universal code 1, custom code A, custom code B, universal code 2, custom code C or custom code D to generate the U1-, CA-, CB-, U2-, CC- and the CD- signals. These signals are applied to select the desired code as previously described.

FIG. 13 illustrates the circuitry that comprises the code level select switch 14 (FIG. 1) and is generally referred to as 1110. The switch 14 can be positioned in either the off position or levels 1, 2 or 3 which generate the L1-, L2- and L3- signals, respectively. These signals are applied to select the desired code level to be input.

FIG. 14 represents the circuitry comprising the universal key lock 12 and custom key lock 16 illustrated in FIG. 1, and is generally referred to as 1114. The custom switch 16, shown in its closed position in FIG. 14 generates the CKEY- signal. The universal code switch 12, shown in its closed position in FIG. 14, generates the UKEY- signal. Switches 1114 and 1116 in the closed position permit both universal and custom codes to be utilized for enciphering. Alternatively, either the custom or the universal code can be used individually.

Test Circuitry

Figure 15:
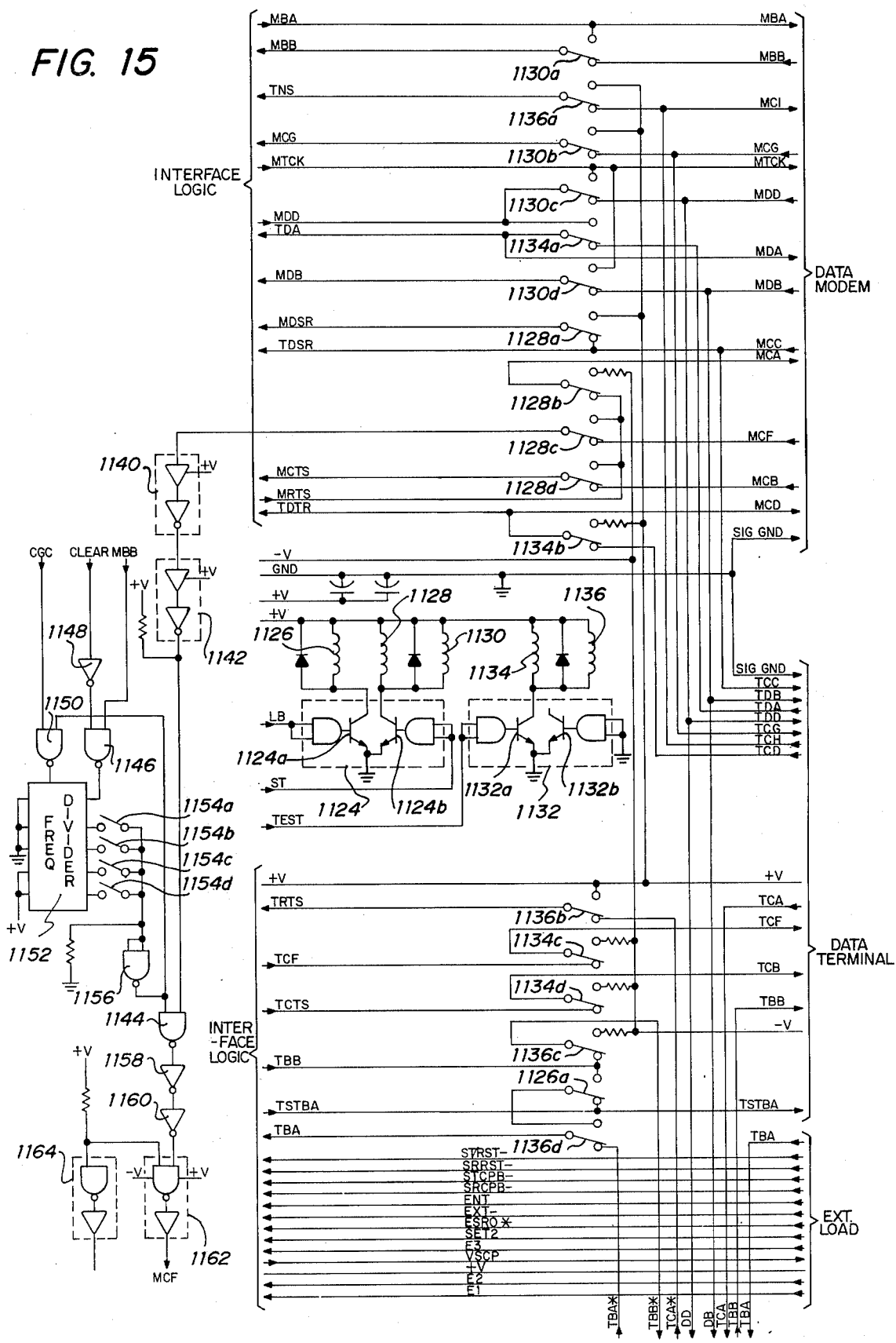
FIG. 15 is a schematic diagram of the test circuitry shown in FIG. 2.

Referring now to FIG. 15, the circuitry comprising the test circuitry 58 of FIG. 2 is shown. The LB signal is applied from the interface logic 62 (FIG. 2) to a driver circuit 1124. Driver circuit 1124 may comprise, for example, a 75452 I/C. The output of transistor 1124a is applied to a relay coil 1126. Actuation of relay coil 1126 closes relay contact 1126a to place the unit 10 in the loop back test mode.

The ST signal is generated by the interface logic 62 and is applied to driver 1124. The output of transistor 1124b is applied to relay coils 1128 and 1130. Actuation of relay coils 1128 and 1130 causes relay contacts 1128a–d and relay contacts 1130a–d to close to place the unit 10 in the self-test mode, thereby disconnecting the unit 10 from the data modem 64.

In the self-test mode of operation all send outputs from the interface logic 62 to the data modem 64 are connected to the receive inputs from the data modem 64. For example, the MRTS signal, request to send to the modem is connected through relay contact 1128d to form the MCTS signal clear to send from the modem to the interface logic 62. The MTCK signal is routed through relay contact 1130d to generate the MDB signal to the interface logic 62, and the MBA send data output to the modem is routed through relay contact 1130a to generate the MBB, receive data from the modem to the interface logic 62.

The TEST signal is applied from the interface logic 62 to a driver 1132. Driver 1132 may comprise, for example, a 75452 I/C. The TEST signal is generated whenever the test switch 40 (FIG. 1) is positioned to any of the three test modes, TM, LB or ST. The output of transistor 1132a is applied to relay coils 1134 and 1136. Actuation of relay coils 1134 and 1136 closes relay contacts 1134a–d and 1136a–d to disconnect the unit 10 from the data terminal 56 (FIG. 2).

FIG. 15 illustrates the positioning of the relay contacts 1126a, 1128a–d, 1130a–d, 1134a–d and 1136a–d, when test switch 40 is in the off position. FIG. 15 also illustrates a portion of the resynchronization circuit previously described with reference to FIG. 5a. The MCF, carrier detect from the modem is applied through relay contact 1128c to receiver 1140 which is interconnected to receiver 1142. Receivers 1140 and 1142 may comprise, for example, a 75154 I/C. The output of receiver 1142 represents the carrier detect, which is applied to NAND gate 1144.

The MBB signal is applied to NAND gate 1146 and the CLEAR signal is applied through inverter 1148 to NAND gate 1146. The CGC signal is applied to NAND gate 1150, whose output together with the output of NAND gate 1146 is applied to a frequency divider 1152. Frequency divider 1152 is a 24 state frequency divider and may comprise, for example, a 4521 I/C. Switches 1154a–d interconnect the frequency divider 1152 to NAND gate 1156. The output of NAND gate 1156 is applied to NAND gate 1144, which through inverters 1158 and 1160 is interconnected to driver 1162, which also receives an input from driver 1164. Driver 1162 generates the MCF output signal. The carrier detect signal from the modem is inhibited if the receive data from the data modem 64 remains in a constant state for a length of time greater than the period preselected by the programming of switches 1154a–d. Switches 1154a–d are internal switches and are programmable for a 0.2–1.5 second interval. If the state of the receive data from the modem MBB remains constant for the predetermined time period, NAND gate 1156 generates the inhibit signal to inhibit the modem carrier detect signal, thereby generating the MCF signal to cause a resynchronization cycle.

The carrier detect signal generated from the data modem 64 indicates that there is a detected carrier being received, which indicates data is being transmitted to the unit 10. Should a problem develop in either the send or receive unit 10, the data modems or the data link, the carrier detect signal will be inhibited to cause a resynchronization cycle to occur.

The operation of the various testing modes will now be summarized. To test a data link in one direction only, the test switch 40 (FIG. 1) is positioned in the TM position on the send end of the data link. The send unit 10 is thereby disconnected from the data terminal and the test pattern previously decribed is connected to the send data input (terminal BA). The terminal BB indicator on the front panel of the unit 10 on the receive end of the data link should illuminate according to the three second test pattern. If an erroneous indication is received, the push-button 30 on the send end of the data link should be depressed to resynchronize the data link. If an out of sync condition persists, the code settings on the code selector switches 14 and 18 on both ends of the data link should be checked to determine if identical code settings are used. This test mode verifies the code settings of the unit 10 on both ends of the data link. If the out of sync condition cannot be corrected, each unit should be checked in the self-test mode to be subsequently described.

To test the complete data link, both modems and the unit 10 on each end of the data link, the send unit 10 test switch 40 is placed in the TM position and the receive unit 10 test switch 40 is placed in the LB position. The modems should be in their normal operating modes. The send unit 10 is thereby disconnected from the data terminal and the test pattern is connected to the send data input. The receive unit 10 is thereby disconnected from the data terminal and the receive decoded data output is connected directly to the send data input. After resynchronization, the terminal BA and BB indicators on the front panel of unit 10 should illuminate in unison on both the send and receive unit 10. Failure of these indicators to illuminate in unison indicates an out of sync condition. This test verifies the entire communication link and the code settings of both send and receive unit 10.

In the ST test mode the unit 10 is sending data to itself and does not test for the proper entry of the code variables. A successful test indicates that all control circuits and interface circuits are properly working. Three self-tests can be conducted. The first self-test tests the unit 10 by itself. The test switch 40 is placed in the ST position and the push-button 30 is depressed. After resynchronization, the terminal BA and BB indicators should illuminate in unison if the unit 10 is properly operating.

The second self-test tests the unit 10 and the modem at one end of the data link. The test switch 40 is positioned to the TM position and the modem is placed in the analog loop back test mode. In this mode the modem transmitter output should be connected to the received input. The control signals in the interface logic 62 must work normally. The push-button switch 30 is depressed and after synchronization, the terminal BA and BB indicators should illuminate in unison at the three second repetition rate previously described. The third self-test that can be conducted tests one of the units 10 and both modems. The test switch 40 is positioned to the TM mode and the modem test function on the opposite end of the communications link is set to the digital loop back test mode in which the receive data output is looped back to the send data input. The pushbutton 34 is then depressed and the terminal BA and BB indicators should illuminate in unison to indicate a proper operation of the sending unit 10 and both data modems.

Asynchronous Converter

Figure 16A:
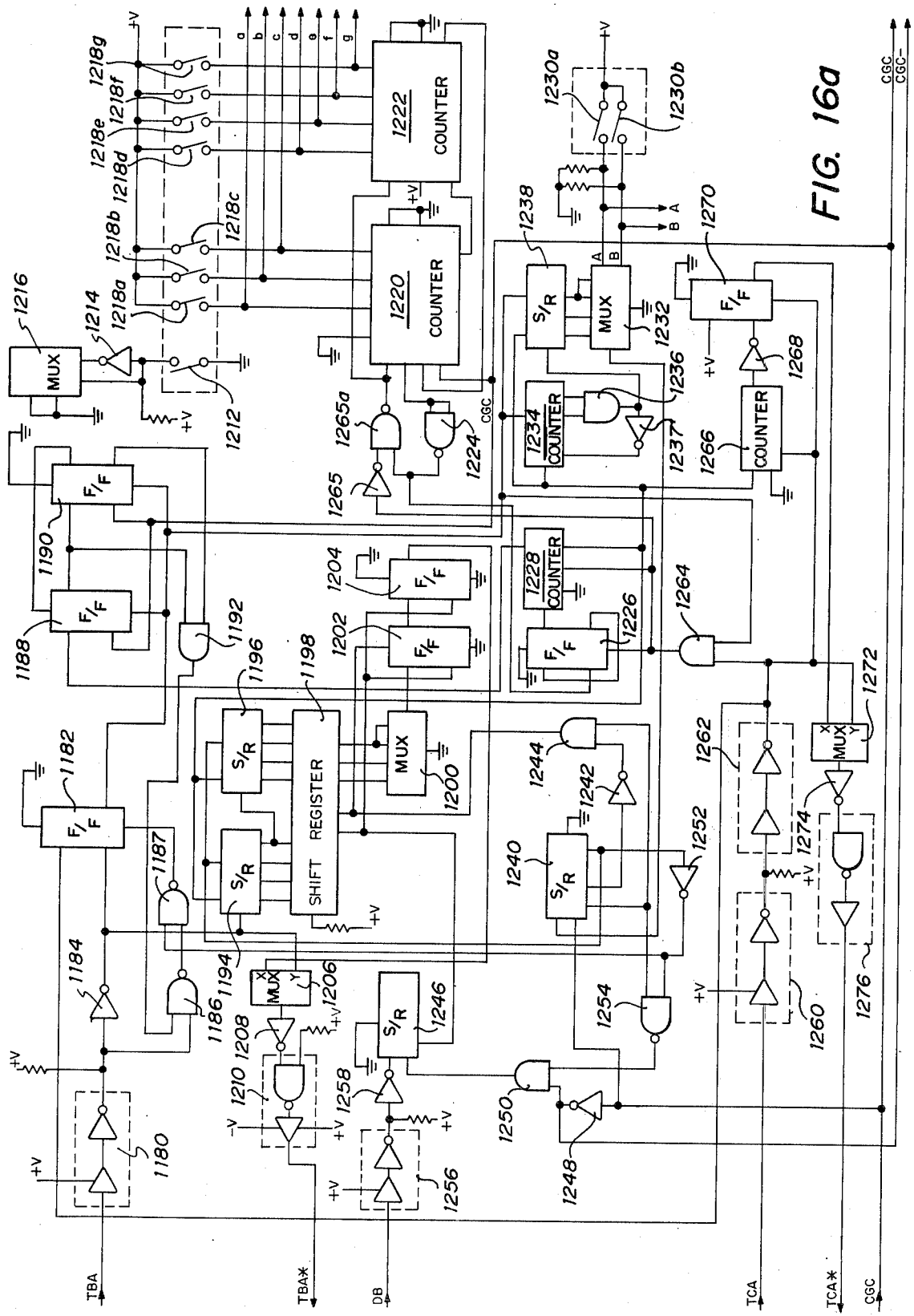
FIGS. 16a and 16b are schematic diagrams of the asynchronous converter shown in FIG. 2.
Figure 16B:
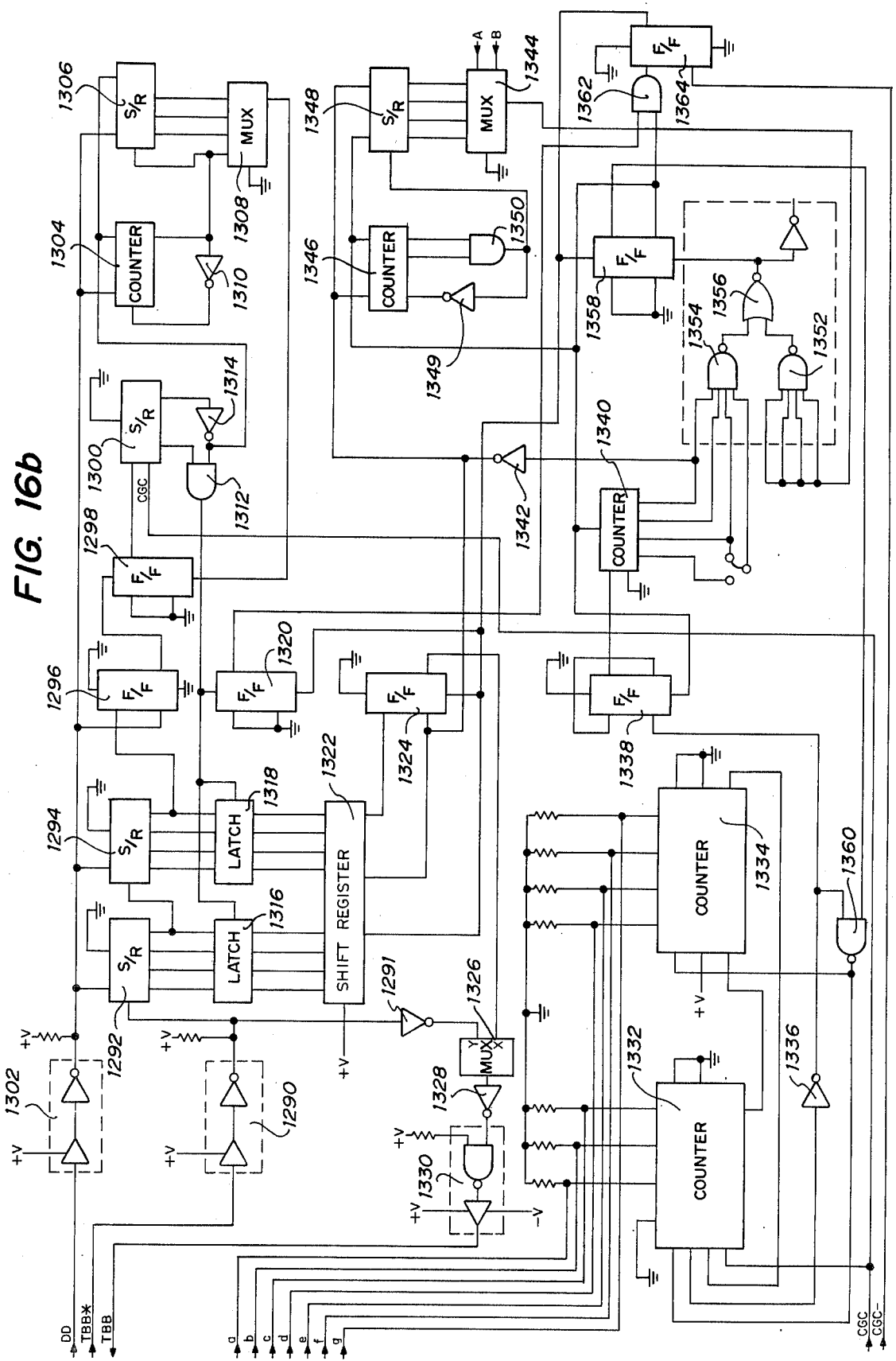

Referring now to FIGS. 16a and 16b, the circuitry comprising the asynchronous converter represented by block 60 in FIG. 2 is shown. FIGS. 16a and 16b are drawn to be matched in a side-by-side relationship to illustrate the entire electrical schematic. As previously stated, the asynchronous converter 60 is interconnected between the test circuitry 58 and interface logic 62 (FIG. 2). The asynchronous converter 60 functions to convert asynchronous data from the data terminal 56 to synchronous data for utilization by the interface logic 62, and functions to convert synchronous data from the interface logic 62 to asynchronous data for utilization by the data terminal 56.

Referring to FIG. 16a, the circuitry for converting asynchronous data to synchronous data is illustrated. The TBA signal is the form of asynchronous data is applied from the data terminal 56 (FIG. 2) to a receiver 1180. Receiver 1180 may comprise, for example, a 75154 I/C. Receiver 1180 is interconnected to a flip-flop 1182 through inverter 1184. Receiver 1180 is also interconnected to flip-flop 1182 through NAND gates 1186 and 1187. The output of flip-flop 1182 is applied to prise, for example, a 75150 I/C. Driver 1210 generates the TBA* output signal, which represents synchronous data converted from the TBA asynchronous input data.

The asynchronous converter 60 may also be utilized to route synchronous data through converter 60 to the interface logic 62. If the TBA signal was synchronous data initially, the output of inverter 1184 would apply this synchronous data to the "Y" input of multiplexer 1206. The output of driver 1210 would, therefore, represent synchronous data applied to the interface logic 62. A mode select switch 1212 is utilized to select either the "X" or "Y" inputs to multiplexer 1206 depending upon whether the input data is asynchronous or synchronous. Mode select switch 1212 in the open position programs the converter 60 to receive asynchronous data and, therefore, the X input to multiplexer 1206 is selected. Mode select switch 1212 in the closed position programs the converter 60 to receive synchronous data, which is applied to the Y input of multiplexer 1206. Select switch 1212 is interconnected to an inverter 1214, which is interconnected to a multiplexer 1216. Multiplexer 1216 is a four bit AND/OR selector multiplexer and may comprise, for example, a 4519 I/C.

An input to shift registers 1194 and 1196 is the asynchronous data rate, which is used to clock the asynchronous data into shift registers 1194 and 1196. This asynchronous data rate must be generated by the converter 60 from the internal clock of the unit 10. Various asynchronous data rates can be utilized depending upon the type of asynchronous data being generated by the data terminal 56. The desired data rate is programmable by operation of switches 1218a–1218g. The position of these switches is determined by the particular asynchronous data rate desired. For typical asynchronous data rates, the switch positions of switches 1218a–g are tabulated in Table 1 below.

TABLE 1

| Asynchronous Data | Switch 1218 | | | | | | |
|---|---|---|---|---|---|---|---|
| Rate, Hz | a | b | c | d | e | f | g |
| 1800 | open | closed | closed | open | open | open | open |
| 1200 | closed | open | open | closed | open | open | open |
| 600 | open | closed | open | open | closed | open | open |
| 300 | open | open | closed | open | open | closed | open |
| 150 | open | open | open | closed | open | open | closed |
| 135 | open | open | open | open | closed | open | closed |
| 110 | open | closed | open | open | open | closed | closed | flip-flops 1188 and 1190. The output of flip-flop 1190 is interconnected to NAND gate 1186 through AND gate 1192.

The asynchronous data through inverter 1184 is also applied to a shift register 1194, which is interconnected to a shift register 1196. Shift registers 1194 and 1196 are four stage static shift registers and may comprise, for example, 4015 I/Cs. The outputs of shift registers 1194 and 1196 are applied to a shift register 1198. Shift register 1198 is an eight bit shift register and may comprise, for example, a 4021 I/C. The output of register 1198 is applied to a multiplexer 1200. Multiplexer 1200 is a dual four channel select multiplexer and may comprise, for example, a 4539 I/C. The output of multiplexer 1200 is applied to a flip-flop 1202, which is interconnected to a flip-flop 1204. The output of flip-flop 1204 is applied to the "X" input of a multiplexer 1206. Multiplexer 1206 is a four bit AND/OR selector multiplexer and may comprise, for example, a 4519 I/C. The output of multiplexer 1206 is applied through inverter 1208 to a driver 1210. Driver 1210 is a dual line driver and may com- The outputs of switches 1218a–1218g are applied to counters 1220 and 1222. Counters 1220 and 1222 are divide-by-N four bit counters and may comprise, for example, 4526 I/Cs. The CGC fast clock generated by the unit 10 is applied to counter 1220. The CGC clock is 691,200 Hz and this frequency is divided by counters 1220 and 1222 according to the inputs generated by the closing of switches 1218a–1218g. Switches 1218a–g apply a 2, 4, 8, 16, 32, 64 and a 128 input to counters 120 and 122, which form the divisor for the 691,200 Hz fast clock signal. For example, if an asynchronous data rate of 1800 Hz were desired, switches 1218b and 1218c would be closed while the other switches 1218 would remain open. The closing of switches 1218b and 1218c would apply a 4 and an 8 input to counter 1220 to cause counter 1220 to divide the fast clock frequency by 12.

The output of counters 1220 and 1222 is applied through NAND gate 1224 to a flip-flop 1226, which is interconnected to a counter 1228. Counter 1228 is a dual binary up counter and may comprise, for example, a 4520 I/C. Counter 1228 performs a further division of the output frequency of counters 1220 and 1222 by dividing the output frequency by 32. The output of counter 1228 will, therefore, represent the selected asynchronous data rate of approximately 1800 Hz which is applied to shift registers 1194 and 1196.

To further illustrate the operation of switches 1218a–1218g and counters 1220, 1222 and 1228, suppose it is desired to operate the converter 60 at the 110 Hz asynchronous data rate. Referring to Table 1, switches 1218b, 1218f and 1218g must be placed in the closed position. The closing of these three switches provides a 4, 64 and 128 input signal to counters 1220 and 1222 to provide a divisor of 196. The CGC clock signal of 691,200 Hz is divided by 196 through operation of counters 1220 and 1222. The output frequency of counter 1220 is approximately 3,526.5 Hz which is applied through flip-flop 1226 to counter 1228. Counter 1228 divides this output frequency by 32, which produces an asynchronous data rate of approximately 110 Hz, which is applied to shift registers 1194 and 1196.

The number of bits per character of the asynchronous data must also be preselected depending upon the type of asynchronous data being converted by the converter 60. There may be 8, 9, 10 or 11 bits per character of asynchronous data and this information is preprogrammed by operation of switches 1230a and 1230b. The positioning of switches 1230a and 1230b is determined by the number of bits per character selected. For a typical number of bits per character, the switch positions of switches 1230a and 1230b are tabulated in Table 2 below.

TABLE 2

| Asynchronous Code Level | Bits/ Character | Switch 1230 a | b |
|---|---|---|---|
| 6 | 8 | open | open |
| 7 | 9 | closed | open |
| 8 | 10 | open | closed |
| 8 | 11 | closed | closed |

Once selected, the number of bits per character is applied via signal lines A and B to multiplexer 1232. Multiplexer 1232 is a four channel select/multiplexer and may comprise, for example, a 4539 I/C. The asynchronous data rate generated at the output of counter 1228 is applied to a counter 1234. Counter 1234 is a dual binary up counter and may comprise, for example, a 4520 I/C. The output of counter 1234 is applied through AND gate 1236 to a shift register 1238 and through an inverter 1237 to counter 1234. Shift register 1238 is a dual four stage static register and may comprise, for example, a 4015 I/C. The output of shift register 1238 is applied to multiplexer 1232 to generate an output signal which signifies that a completed character of asynchronous data has been received by the converter 60.

The character complete signal generated by multiplexer 1232 is applied to a shift register 1240. Shift register 1240 is interconnected through inverter 1242 to AND gate 1244. The output of AND gate 1244 is applied to counter 1198 and is a signal to counter 1198 to dump the preselected number of bits of asynchronous data from shift registers 1194 and 1196 into shift register 1198. The rate at which the asynchronous data is clocked out of shift register 1198 and into multiplexer 1200 is determined by the synchronous clock rate supplied by the data modem 64 (FIG. 2).

The synchronous clock rate is applied to shift register 1198 from a shift register 1246. Shift register 1246 receives the CGC fast clock rate through an inverter 1248 and AND gate 1250. A second input to AND gate 1250 is applied from the shift register 1240 through an inverter 1252 and NAND gate 1254. The transmit clock DB from the data modem 64 is also applied to the shift register 1246 through a driver 1256 and an inverter 1258.

The request to send signal TCA is applied to a driver 1260 which is interconnected to a driver 1262. Driver 1262 is interconnected to AND gate 1264, which supplies its output to flip-flop 1226, counter 1228, and through inverter 1265 and NAND gate 1265a to counters 1220 and 1222. Driver 1262 is also interconnected to a counter 1266, which through inverter 1268 is interconnected to a flip-flop 1270. The output of flip-flop 1270 is applied to the "X" input of a multiplexer 1272. The output of multiplexer 1272 is interconnected through an inverter 1274 to a driver 1276 to generate the TCA* output signal. The output of flip-flop 1270 is applied to the "X" input of multiplexer 1272. If the mode select switch 1212 is in the open position, the converter receives asynchronous data. If synchronous data is received by the converter 60, mode select switch 1212 is closed so that the TCA signal is then applied to the "Y" input of multiplexer 1272 to be merely routed through the converter 60 as synchronous data.

To summarize the conversion from asynchronous to synchronous data performed by asynchronous converter 60, mode select switch 1212 is placed in the open position, switches 1218 are positioned to generate the desired asynchronous data rate and switches 1230 are positioned to generate the desired number of bits per character of the asynchronous data. Upon receipt of a request to send TCA signal the output of receiver 1262 is applied to the input of flip-flop 1182. Upon receipt of the leading edge of the start bit of asynchronous carrier, flip-flop 1182 is set and flip-flops 1188 and 1190 are reset. If the data has gone to a zero level halfway through a bit, flip-flops 1188 and 1190 produce a reset and shut flip-flop 1182 off. The purpose of this reset is to prevent noise from being received and then converted to meaningless data by the converter 60. Flip-flops 1188 and 1190 comprise a false start detector circuit which interrogates the data line to insure that it is at a zero level. If the data line is not at a zero level, flip-flops 1188 and 1190 will generate a reset pulse to reset flip-flop 1182. Assuming that no reset is necessary, the asynchronous data gets clocked into the shift registers 1194 and 1196. The number of data bits clocked into these shift registers is determined by the position of switches 1230a and 1230b which determine the number of bits per character.

The request to send signal, TCA, also begins the counting down process to generate the asynchronous data rate through switches 1218, counters 1220, 1222 and 1228. The asynchronous clock rate is then applied to shift registers 1194 and 1196. The output of multiplexer 1232 designating that a completed character has been received is applied to shift register 1240. Shift register 1240 is then triggered to dump the data from shift registers 1194 and 1196 into shift register 1198. Since the start bit of the asynchronous character was lost in flip-flop 1182, flip-flop 1202 receives a start bit from shift register 1198. Shift register 1198 is parallel loaded and serially dumped type of register. The data is then clocked out of shift register 1198 using the synchronous clock from the data modem into the multiplexer 1200 and is applied through flip-flops 1202 and 1204 to multiplexer 1206.

Referring to FIG. 16b, the circuitry representing the receive portion of the asynchronous converter 60 is shown. This circuitry receives the TBB* signal in synchronous form and converts this data to the TBB signal as asynchronous applied to the data modem 64 (FIG. 2). The TBB* signal is applied through a receiver 1290 to shift registers 1292 and 1294. Shift registers 1292 and 1294 are dual four stage static registers and may comprise, for example, 4015 I/Cs. The output of shift register 1294 is applied to a flip-flop 1296, whose output is applied to a flip-flop 1298. The asynchronous start bit will be applied to flip-flop 1298 to begin the clocking process. Flip-flop 1298 is interconnected to a shift register 1300, which also receives the CGC signal.

The receive clock from the modem DD is applied through receiver 1302 to shift registers 1292, 1294, flip-flop 1296, a counter 1304 and a shift register 1306. The output of shift register 1306 is applied to a multiplexer 1308 and through an inverter 1310 to counter 1304. An output of counter 1304 is applied to AND gate 1312. The outputs of shift register 1300 are applied directly and through an inverter 1314 to AND gate 1312. The output of AND gate 1312 is applied to latches 1316 and 1318 and a flip-flop 1320. Latches 1316 and 1318 are quad clocked "D" latches and may comprise, for example, a 4042 I/C.

Latches 1316 and 1318 are interconnected to a shift register 1322 whose output is applied to a flip-flop 1324. The output of flip-flop 1324 is applied to the "X" input of a multiplexer 1326. Multiplexer 1326 is a four bit AND/OR selector multiplexer and may comprise, for example, a 4519 I/C. The output of multiplexer 1326 is applied through an inverter 1328 to a driver 1330 to generate the TBB output signal, which is asynchronous converted data. If mode select switch 1212 (FIG. 16a) was in the closed position, the synchronous data would be applied from the output of receiver 1290 through an inverter 1291 to the "Y" input of multiplexer 1326 for routing through converter 60.

The switches 1218a–1218g (FIG. 16a) are interconnected to counters 1332 and 1334 along signal lines a–g. Counters 1332 and 1334 are programmable divide-by-N four bit counters and may comprise, for example, 4526 I/Cs. Counter 1332 receives the CGC, 961,200 Hz fast clock signal, and has an output through inverter 1336 to flip-flop 1338. The output of flip-flop 1338 is applied to a counter 1340. Counters 1332, 1334 and 1340 together with flip-flop 1338 comprise a counter chain similar to counters 1220, 1222 and 1228 and flip-flop 1226 (FIG. 16a) of the synchronous to asynchronous conversion portion of converter 60. An independent counter chain is required for the synchronous to asynchronous conversion performed by the circuitry of FIG. 16b and is operable to clock the data out of counter 1322 to flip-flop 1324.

The output of switches 1230a and 1230b (FIG. 16a) are applied along signal lines A and B to a multiplexer 1344. The asynchronous clock rate is applied from inverter 1342 to a counter 1346 and a shift register 1348. An output of counter 1346 is applied through AND gate 1350 to shift register 1348 and through an inverter 1349 to counter 1346. The output of shift register 1348 is applied to multiplexer 1344. The output of multiplexer 1344 is applied to a NAND gate 1352. Multiplexer 1344, counter 1346 and shift register 1348 perform a function similar to that of multiplexer 1232, counter 1234 and shift register 1238 (FIG. 16a) to generate a signal signifying that a character of asynchronous data is complete.

The output of counter 1340 is applied to NAND gate 1354 whose output together with the output of NAND gate 1352 is applied to OR gate 1356. NAND gates 1352 and 1354 together with OR gate 1356 form a triple gate and may comprise, for example, a 4501 I/C. The output of OR gate 1356 is applied to a flip-flop 1358. The output of flip-flop 1358 is applied through NAND gate 1360 to counter 1332, and is applied to AND gate 1362 to a flip-flop 1364. The output of flip-flop 1364 is applied to shift register 1322 and is a signal to shift register 1322 to dump the synchronous data from latches 1316 and 1318 into shift register 1322. The data in shift register 1322 is then shifted out through flip-flop 1324 under the control of the asynchronous clock rate to the "X" input of multiplexer 1326 as asynchronous data.

Cryptographic System Operation

Operation of the present system will now be summarized utilizing the circuitry previously described. For simplicity of discussion, it will be assumed that the asynchronous converter 60 is not utilized. The asynchronous converter 60 when used merely functions to perform a data conversion between the data terminal 66, interface logic 62 and data modem 64. The test circuitry 58 can be considered to be directly connected to the interface logic 62. In this discussion, it will also be assumed that all system tests have been conducted utilizing switch 40 (FIG. 1), therefore, the test circuitry 50 merely performs a routing function between the data terminal 56 and interface logic 62 and between interface logic 62 and the data modem 64.

Referring to FIG. 2, the data modem 64 has a set of interface circuits based on RS 232C standards in the EIA specifications. These circuits control the data signals from the interface logic 62 and data modem 64 to the encoding unit 10 and further control the operation of the encoding unit 10. The interface logic circuits 62 convert the EIA signals to standard logic levels and operate upon these logic levels to produce control signals, which are applied to the control logic circuit 66, the key variable storage generator 68 and the code generator 80. The control logic 66 controls the key variable storage in the code generators 80 and 78 to cause them to synchronize in the proper manner.

The operation of the system is begun at the data terminal 58 (FIG. 2), which generates the request to send signal TRTS and applies it to the request to send control logic 102 (FIG. 3). The request to send control logic 102 converts the data transmitted to the EIA send signal request into digital form and also checks to see if the clear push-button 22 (FIG. 1) has been depressed. If the clear push-button 22 has not been depressed, no alarm signals are present and if the data terminal ready control logic 108 is in the "on" state, the signal DR is generated. The DR signal causes the request to send signal to be converted by the request to send control logic 102 into the MRTS signal which is applied to the data modem 64 (FIG. 2).

After the data modem 64 has received the request to send output MRTS, it will generate the MCTS signal, which is applied to the clear send control logic 106 (FIG. 3). The clear to send control logic 106 then generates the PRB signal, which is sent to the transmit control portion of the control logic circuitry 66 (FIG. 2).

The PRB signal is applied to the send frame and corp generator 502 (FIG. 6), which generates the frame timing signals and the correlation patterns. The PRB signal also is applied and initiates the send controller 504 (FIG. 6). At this point, the transmit portion of the control logic 66 (FIG. 2) is in the frame synchronization phase or frame synchronization mode, in which the transmit control logic sends out an inverted correlation pattern. The number of inverted correlation patterns will depend upon the internal programming of the unit and may either be 3, 5 or 17 bit patterns. At the end of the predetermined number of correlation patterns, the transmit portion of the control logic circuitry 66 will shift automatically and send out one upright correlation pattern. At the completion of the upright pattern, or start pattern, the unit shifts to the prime pattern, and prime mode of operation. In the prime mode of operation, the control logic 66 will transfer the prime data from the transmit portion of control logic 66 (FIG. 2) to the receive portion of the control logic. The transfer is accomplished in one of three different levels of redundancy, either a 15 bit or 7 bit redundancy or no redundancy.

When the PRB signal is in the one state in the frame synchronization mode, the code generator checker 512 (FIG. 6) is caused to go through a dummy check cycle to verify that it is operating properly. The data to the code generator checker is placed artificially in an unsatisfactory mode and the code checker 512 is caused to go through a complete cycle and initiate an alarm state. When the code checker goes to the prime mode this alarm state is reset to zero. However, the fact that the code generator checker properly operated is remembered and in the TCRYPT mode the code generator checker is operative in its normal fashion, checking the output of the code generator send 80 (FIG. 2).

In the prime mode of operation, an upright correlation pattern will correspond to a prime data bit value of one and an inverted correlation pattern will correspond to a prime data bit value of zero. The prime data is received from the code generator send 80 (FIG. 2) and is sent via the line TPDO to the prime data control 506 (FIG. 6). The TPDO signal is primarily used for generating test signals and is returned to the code generator send 80 via the line TPDI. The TPDI signal is also routed to the send data control 500 (FIG. 6) together with the correlation pattern generated by the correlation generator 502.

The send data control 500 performs a modulo-2 addition on the prime data and the correlation pattern to provide the inverted and noninverted correlation patterns for the transfer of prime data. Each time a correlation pattern is transmitted, the prime counter 508 (FIG. 6) accumulates one count. Also, at the end of each correlation pattern, the send RK generator 510 generates one request for key to enable the code generator 80 (FIG. 2) to obtain the next prime data bit. Once the prime counter 508 has counted to its completion, 25 bits, it sends out a signal TLOAD* to the key variable storage circuit 68 (FIG. 2).

In the key variable storage circuit 68 (FIG. 2) the TLOAD* signal is applied to the key variable logic control send 860 (FIG. 9). The key variable logic control send 860 causes the key variable memory send 854 to be sampled, which causes the key variable memory send to perform in a load cycle.

In the load cycle, the key variables in memory that are selected through the keyboard 20 (FIG. 1) are transferred from memory to the code generator 80 (FIG. 2) via the key variable distribution logic send 862 (FIG. 9).

The completion of the load cycle by key variable memory send 854 is indicated to the key variable input control 866 (FIG. 9), which causes the key variable logic control send 860 to generate the CRYPT(T) signal. The CRYPT(T) signal permits the code generator send 80 (FIG. 2) to initialize itself.

The number of data bits required and the number of master clock cycles required for the completion of the loading and initialization of the code generator send 80 (FIG. 2) has a fixed value and as a result requires a varying number of data bits depending upon the data rate. Therefore, within the key variable logic control send 860 (FIG. 9), there is a counter 1012 (FIG. 10) which will count data clocks and will count 2, 4, 8 or 16 clocks depending on the data rate. When counter 1012 counts to completion, a signal TCRYPT is sent from the key variable logic control send 860 (FIG. 9) to the code generator checker 512 (FIG. 6).

The TCRYPT signal is also applied to the send controller 504 (FIG. 6) and the send clear control 110 (FIG. 3). The application of the TCRYPT signal to the send clear control 110 prevents the unit 10 from being placed in the clear mode should the send clear push-button 28 (FIGS. 1 and 3) be depressed. The TCRYPT signal is also applied to the clear to send control logic 106 (FIG. 3). Assuming the data terminal ready control logic 108 (FIG. 3) is set correctly and the alarm circuit is off, the clear to send control logic 106 will then send out the clear to send signal TCTS to the data terminal (FIG. 2). The sending of the TCTS signal to the data terminal 60 completes the initialization of the transmit portion of the system.

In the operation of the receive portion of the system, the modem 64 (FIG. 2) will indicate to the unit 10 via the signal MCF, which is a modem carrier detect signal applied to the carrier detect control logic 126 (FIG. 3), that the modem is receiving a signal and receiving data. The carrier detect signal MCF will check through the receive clear control 120 (FIG. 3) to detect whether the receive clear push-button 32 (FIGS. 1 and 3) has been depressed. If the receive clear push-button 32 has not been depressed the carrier detect control logic 126 (FIG. 3) will generate the REC signal.

The REC signal is applied to the control logic 66 (FIG. 2) and in particular to the receive correlator 514 (FIG. 6) and receive controller 518 (FIG. 6). The receive correlator 514 then begins to detect the correlation patterns. The receive correlation 514 must detect the frame synchronization determined in the receive correlator 514 and must receive two correlation patterns exactly. Once the receive correlator 514 has detected a perfect correlation pattern, the receive frame generator 516 (FIG. 6) is initialized so that the internal frame generator is in synchronism with the perfect correlation pattern that was received by the receive correlator 514. The receive controller 518 then operates to detect the second perfect correlation pattern at the next time the receiving frame generator 516 comes to the end of its frame. In this operation, the receive frame generator 516 is now generating a frame internally while it is receiving a frame in a correlation pattern from the transmitting unit. The timing of both these frames must be exactly correct. Before the receive portion of the control logic 66 (FIG. 2) will begin to detect the start pattern, two successive correlation patterns must be perfectly received.

After two correlation patterns have been perfectly received by the receive correlator 514, it is placed in the start standby mode and operates to detect the start pattern. When the start pattern is received, the receive correlator 514 looks only for a majority decision of a pattern. That is, if the pattern is a 15 bit pattern the receive correlator need only look for 8 correct bits in order to initialize the prime state. Similarly, if the pattern is a 7 bit pattern the receive correlator 514 need only look for 4 correct bits. Once the start pattern is received and detected, by the simple majority logic, the receive controller 518 places the system into the RPRIM mode of operation.

The RPRIM signal generated by the receive controller 518 is also applied to the receive RK generator 522 (FIG. 6) and the receive prime counter 524 (FIG. 6). The receive prime counter 524 then begins to count the number of prime data bits received. The prime bits are detected in the receive correlator 514 if correlation pattern redundancy is used and again a majority decision is necessary. An upright pattern has a logic value of one for that prime bit and an inverted pattern has a logic value of zero for that prime bit. At the end of each frame an RRK signal is generated by the receive RK generator 522 to the receive code generator 78 (FIG. 2) indicating that another prime bit is being sent to the code generator and to be prepared for receiving a succeeding bit. When 25 of the RRK signals have been generated, the receive prime counter 524 will complete its count and generate a signal RLOAD*.

The RLOAD* signal is applied to the key variable storage 68 (FIG. 2) and in particular to the key variable logic control receive 868 (FIG. 9). The key variable logic control receive 868 then generates a load signal to the code generator receive 78 (FIG. 2). This load signal places the code generator 78 in the load mode, where the key variable selected from the keyboard 20 (FIG. 1) is transferred from memory to the code generator via the key variable distribution logic receive 870 (FIG. 9). Upon completion of the transfer of data, the key variable logic control 868 indicates that the load is complete and generates the CRYPT(R) signal to the code receive 78 (FIG. 2). The CRYPT(R) signal places the code generator 78 in its initialization mode. The key variable logic control receive 868 (FIG. 9) also generates the RCRYPT signal which is applied to the receive RK generator 522 (FIG. 6).

The application of the RCRYPT signal to the receive RK generator 522 (FIG. 6) resets the RK generator to generate one request per key for each data bit clock, and also sets the receive controller 518 into the received crypto mode. The RCRYPT signal is also applied to the receive clear control 120 (FIG. 3) to turn off the receive clear key so that the unit cannot be placed into the clear mode by depressing the receive clear push-button 32 (FIG. 1 and FIG. 3). The RCRYPT signal is also applied to the carrier detect control logic 126 (FIG. 3), which generates the REC signal to enable the data terminal to start receiving data. The RCRYPT signal is also applied to the receive data output buffer 96, (FIG. 3), which generates the TDO receive data output signal which turns on and passes the decoded data from the unit 10 to the data terminal 60 (FIG. 2). The basic unit cycle of operation is therefore complete upon receipt by the data terminal 60 of the RCRYPT signal.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a digital cryptographic system having a first station, including a send data terminal which applies data signals through an enciphering unit for transmission through a first modem over a data link to a second station including a second modem, the output from the second modem applied through a deciphering unit to a receive data terminal, an automatic testing system for the digital cryptographic system comprising:

first switch means for disconnecting the send data terminal from the enciphering unit and for generating a predetermined test pattern for enciphering by the enciphering unit and for transmission through the first modem over the data link to the second modem, means in the deciphering unit for deciphering said test pattern, means on the deciphering unit for visually displaying the deciphered test pattern, second switch means for disconnecting the receive data terminal from the deciphering unit, means in the deciphering unit for generating a predetermined test pattern and for enciphering said test pattern for transmission through the second modem over the data link to the first modem, means in the enciphering unit for deciphering said test pattern, and means at the first station for visually displaying the deciphered test pattern, wherein said visual display at the first station will coincide with said visual display at the second station to indicate proper operation of the digital cryptographic system.

2. The automatic testing system of claim 1 and further including:

third switch means for disconnecting the send data terminal and the first modem from the enciphering unit and for generating at the output of the enciphering unit a test pattern for transmission to the input of the enciphering unit, and means for visually displaying the test pattern at the first station.

* * * * *

UNITED STATES PATENT AND TRADEMARK OFFICE
CERTIFICATE OF CORRECTION

PATENT NO. : 4,170,714

DATED : October 9, 1979

INVENTOR(S) : Kenneth M. Branscome et al.

It is certified that error appears in the above—identified patent and that said Letters Patent is hereby corrected as shown below:

Column 9, line 25, "IMBA Modern receive data indicator" should read -- IMBA Modern send data indicator --.

Column 16, line 10, "to" should read -- or --.

Column 17, line 43, "NANd" should read -- NAND --.

Column 21, line 14, "ALIC" should read -- AL1C --.

Column 31, line 30, "is", first occurrence should read -- in --.

Column 37, line 3, "sighal" should read -- signal --.

Column 38, line 50, "correlation" should read -- correlator --.

Signed and Sealed this

Twenty-ninth Day of April 1980

[SEAL]

Attest:

SIDNEY A. DIAMOND

Attesting Officer

Commissioner of Patents and Trademarks